United States Patent [19]

Janutka et al.

[11] Patent Number: 5,272,892
[45] Date of Patent: Dec. 28, 1993

[54] CONTROL SYSTEM FOR WASHING MACHINE

[75] Inventors: William J. Janutka, West Allis; Richard G. Bernhard, Germantown; Michael L. Smith, Milwaukee; Joseph C. Zuercher, Brookfield; John B. Pardee, Franklin; Ronald R. Jahn, Cedarburg, all of Wis.; William J. Walsh, Naperville; James M. Pick, Elk Grove, both of Ill.; Scott A. Reid, Brookfield, Wis.

[73] Assignee: Eaton Corporation, Cleveland, Ohio

[21] Appl. No.: 735,239

[22] Filed: Jul. 24, 1991

[51] Int. Cl.⁵ .............................................. D06F 33/02
[52] U.S. Cl. .................................. 68/12.02; 68/12.22
[58] Field of Search ................ 68/12.01, 12.02, 12.21, 68/12.22, 207

[56] References Cited

U.S. PATENT DOCUMENTS

| 4,322,031 | 3/1982 | Gehlert | 68/12.22 X |
| 4,528,709 | 7/1985 | Getz et al. | 68/12.22 X |
| 4,643,350 | 2/1987 | DeSchaaf et al. | 68/12.22 X |

FOREIGN PATENT DOCUMENTS

| 61-240997 | 10/1986 | Japan | 68/207 |
| 61-290989 | 12/1986 | Japan | 68/207 |
| 61-290990 | 12/1986 | Japan | 68/12.01 |
| 61-290991 | 12/1986 | Japan | 68/207 |
| 62-14895 | 1/1987 | Japan | 68/207 |
| 62-41692 | 2/1987 | Japan | 68/207 |
| 62-68494 | 3/1987 | Japan | 68/207 |
| 62-172994 | 7/1987 | Japan | 68/207 |

*Primary Examiner*—Frankie L. Stinson
*Attorney, Agent, or Firm*—R. A. Johnston

[57] ABSTRACT

A control system for a washing machine having a transducer mounted on the exterior of the washing receptacle wall and operable to generate acoustic vibrations in the receptacle wall during fluid filling of the receptacle. A receiver detects sound waves within the receptacle generated by the wall vibrations and generates in fill signal indicative of the sound waves. Circuitry is provided for analyzing the fill signal and determining from the acoustic signature of the fill signal the occurrence of total immersion of articles in the fluid; and, the circuitry sends a signal which is operable to then shut off the fluid fill valve.

5 Claims, 22 Drawing Sheets

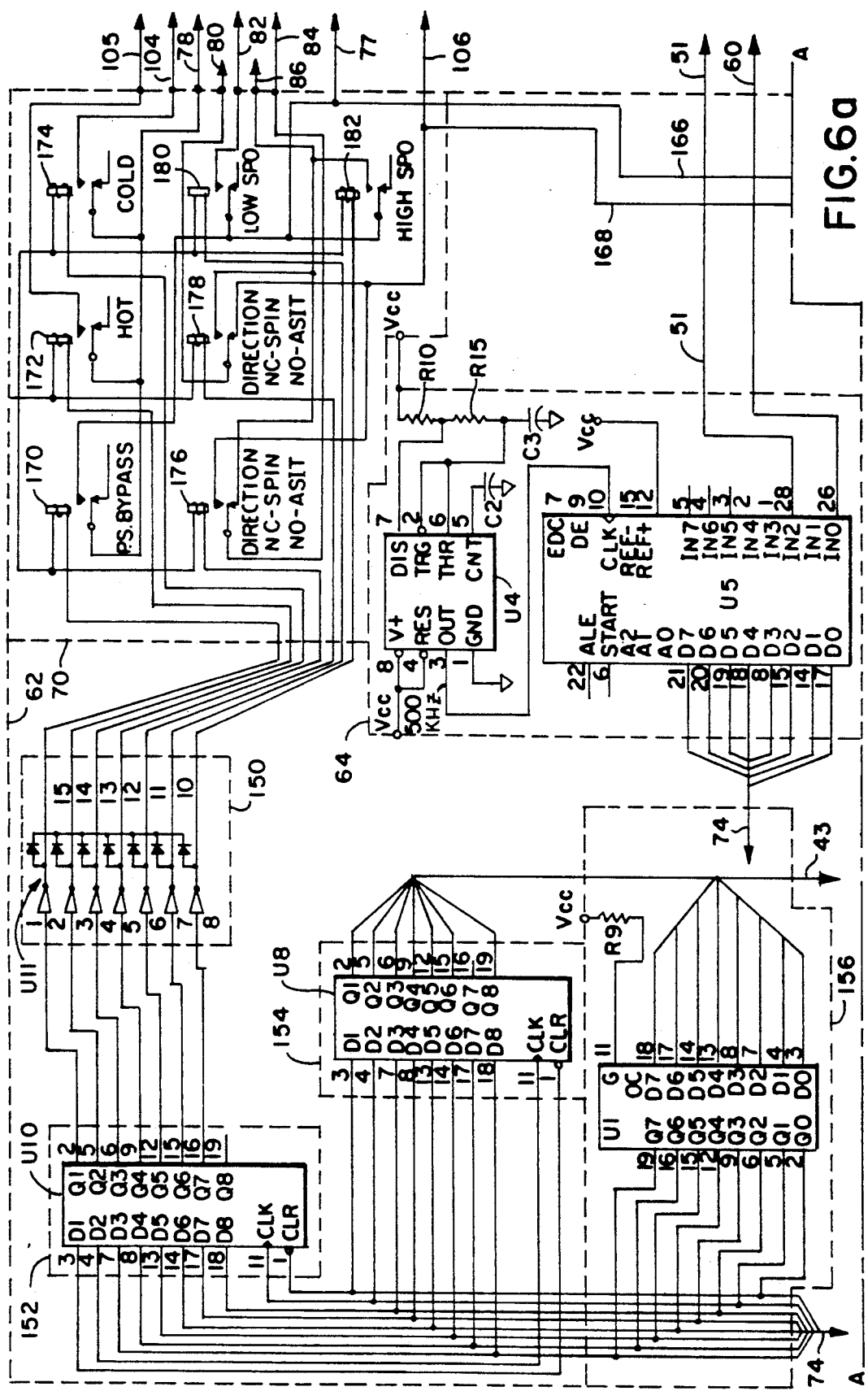

CONTROL SYSTEM FOR WASHING MACHINE

BACKGROUND OF THE INVENTION

The present invention relates to the art of cleansing or laundering articles of apparel in a receptacle with fluid and agitation. The invention relates particularly to control systems for washing machines of the type in which the articles to be laundered are placed in a receptacle or tub which is then partially filled with water and the articles agitated in the water during a program which includes the addition of suitable washing aids, such as detergent, and rinsing with fresh water. A widely used version of such washing machine employs a tub open at the top with a central motor-driven agitator disposed to rotate or oscillate about a vertical axis for providing the desired agitation to effect washing of the clothes.

Typically, such washing machines employ separately connected water lines for hot and cold water, with individual valving mechanisms to control the flow of the water fill to have either hot, cold, or a mixture thereof for portions of the washing cycle or program. A common control system for such washing machines employs a programmer/timer which is set for a desired overall program interval and sequentially controls the activation and deactivation of the water fill valve and the agitator and centrifuging or spin operation of the receptacle for extracting the water from the clothes at the end of the washing program. Typically, the machine user sets the desired time for the washing program by rotating a knob or dial to set the position of a cam drum which is usually rotated through not more than one complete revolution for the program or cycle and sequentially activates a plurality of switches which control the various washing machine functions, such as the water fill valves and the agitate/spin motor during the program. This common type of washing machine control employs a timing motor which drives the cam drum for operating the machine function switches.

Where electronic control of a washing machine program is desired, a micro-computer receives inputs from user actuation of discrete function inputs, such as from a touch panel or a plurality of panel-mounted push buttons to select the desired program interval and selected combination of machine functions for the particular type of washing desired for the particular fabrics of the clothes to be laundered. Both of the aforesaid type washing machine control systems thus rely upon the users knowledge of the characteristics of the clothes to be laundered, such as degree of soil, amount of clothes, and type of fabric to select the appropriate program for effecting the washing.

It has been desired, however, to provide a washing machine which can automatically determine the appropriate length of washing cycle and the minimum amount of water required to effect complete laundering. This latter requirement is particularly important in locations where water is in short supply. In the typical household washing machine, the machine user rotates a knob or dial on the control panel to the desired position indicative of the machine program or cycle interval as a fraction of one full revolution of the dial or knob where an electromechanical program/timer is employed for selecting the machine program. Where electronic circuitry and particularly a micro-computer is employed for controlling the machine program, the user is typically required to provide numerous push button or touch-panel inputs to program the micro-computer for the desired time interval for the cycle in addition to discrete inputs for the selected types of machine functions, such as hot or cold wash, or shortened rinse or spin portions of the program. In the aforesaid typical electronically controlled washing machine, once the user has made the input selections to the electronic control circuitry, there is no visual indication during the progress of the program as to the time interval or remaining functions to be performed for the user to ascertain by a quick glance at the control panel. Thus, although it has been desired to provide electronic control of a washing machine, the rotating indication or "time-out" of the electromechanical timer control knob has provided a convenient and desirable ready indication of the state of the machine program which is readily visible to the user from the control panel.

It has thus been desired to provide for automatic control of a washing machine employing electronic control circuitry and particularly a micro-computer to eliminate an electromechanical machine function switch programmer and to provide for automatic determination of the machine program, including wash time and water fill. It has further been desired to provide for a readily visible indication of a control panel in such an electronically controlled machine such that the user can readily discern, from a glance at the panel, the state of the program. It has further been desirable to provide a washing machine which can automatically limit the amount of hot water introduced into the machine tub in order to limit the BTU content or energy consumed by the washing machine in order to conserve the energy required to heat the water to be used for washing. Such limiting of the thermal energy employed for the warm or hot wash water has become of recent concern in the face of increased cost of fuel or electric power for water heaters and the promulgation of regulations for residential energy consumption by various governmental agencies.

It is known to control the inlet water temperature of a washing machine by alternately cycling open and closed, i.e., by "bang-bang" control, the hot and cold fluid inlet valves. It has also been previously proposed to control the fluid inlet temperature by the use of a proportional mixing valve. Both of these techniques have been found unsatisfactory in terms of service life and manufacturing cost in mass production.

SUMMARY OF INVENTION

The present invention provides an electronic automatic control system for a machine for laundering articles of apparel in a receptacle by the introduction of fluid therein and agitation of the articles in the fluid, and provides for automatic selection of the fill level of the fluid and the duration of the agitation during the laundering program. In particular, the present invention provides an electronic control system for a washing machine and employs the detection of sound within the washing receptacle during fluid fill to determine the rate of rise of fluid in the receptacle and to enable automatic machine determination of the appropriate minimum amount of fluid to be filled in the receptacle for a given load of articles to be laundered. The present invention also employs acoustic or sound level detection techniques for determining the point during the fluid fill that the articles of apparel have become totally immersed in the fluid. The electronic control system of the present invention employs "fuzzy" inference or "fuzzy" logic in the electronic control system for making a determination of the wash time based on sensed wash fluid turbidity and fill level.

In another aspect of the invention, the control system employs optical sensing of wash fluid turbidity as a measure of cleansing or soil condition of the articles to be laundered.

In another aspect of the present invention, the temperature of the water entering the receptacle is sensed by a thermistor and the rate of thermal energy flowing into the receptacle is determined from the known flow rate. The control system integrates the time rate of flow of thermal energy and shuts off the hot water fill when a predetermined level of thermal energy has passed into the receptacle with the fluid fill, thereby enabling the machine to operate in the heated fluid fill mode, yet remain within predetermined limits of thermal energy.

In another aspect of the invention, the control panel employs a touch-sensitive surface with indicia for discrete inputs of selected machine functions which, upon user selection, are illuminated. The control panel includes a secondary display area which is automatically illuminated to indicate the fraction of the overall maximum program interval selected by the machine for the particular selected function inputs. The control panel utilizes a central area for user touching to select the desired machine functions or the initialization of an automatically determined function; and, the central display area is surrounded by a display ring which is illuminated fractionally in proportion to the time associated with the selected functions. As the machine program progresses, the fractional portion of illumination of the outer display decreases progressively to continuously indicate to the user the fraction of the program remaining.

The present invention thus provides a unique and novel electronic control system for a washing machine which employs acoustic sound level detection to determine the water fill, optical wash fluid turbidity sensing to determine the cleansing or soiled condition of the articles to be laundered and fuzzy logic for automatic calculation of wash time. The washing machine of the present invention has a unique display panel for combined user input for machine function selection and time decreasing fractional illumination to indicate the state of the program visually to the machine operator. The central system of the present invention also provides a mode of operation in which the machine automatically limits the total energy of hot water entering the machine.

BRIEF DESCRIPTION OF THE DRAWINGS

FIG. 6a is a portion of the electrical schematic of the control system of FIG. 2 divided along line A—A;

DETAILED DESCRIPTION

Figure 1:
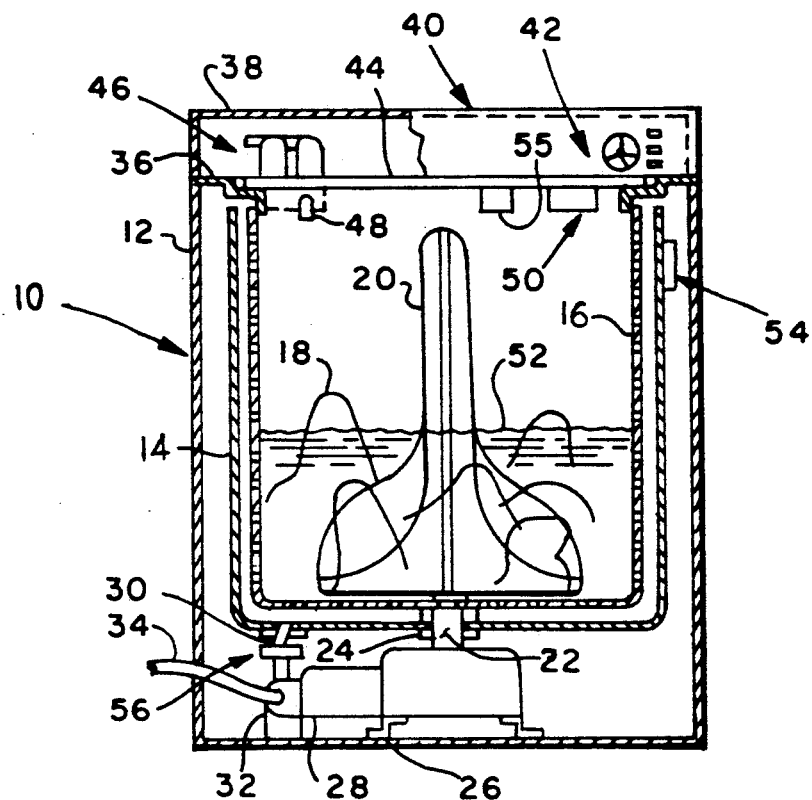
FIG. 1 is a cross-section of a washing machine employing the control system of the present invention.

Referring to FIG. 1, a washing machine employing the present invention is indicated generally at 10 as having a housing or cabinet 12 enclosing a receptacle or wash tub 14 which has rotatably mounted therein a porous basket 16 for receiving therein articles to be laundered 18 and an agitator 20 mounted for rotation and/or oscillation about a vertical axis. The basket is attached to a shaft 22 which passes through an aperture provided in the bottom of the tub 14 and is sealed thereabout by a seal 24; and, the shaft 22 is attached to rotate the agitator 20. Shaft 22 is connected to a power transmission 26 mounted in the cabinet and driven by a drive motor 28.

Tub 14 has a drain tube 30 attached to a port in the bottom thereof and the tube 30 is connected to the inlet of a drain pump 32 also driven by motor 28 which discharges through a tube 34 which passes through the wall of the cabinet 12 and is adapted for connection to an external drain.

The cabinet 12 has a top deck 36 which has attached thereto a control console 38 having a front panel 40 on which is mounted the user operated controls indicated generally at 42 which in the present practice are illuminated, as will be described hereinafter. The top deck has mounted thereon a suitable lid or closure 44 which is hinged for upward movement to permit user access to the interior of the tub 14.

The console 38 has disposed therein an electrically operated fluid fill valve indicated generally at 46 which is operative to mix a flow of hot and cold water selectively for discharge through tube 48 into the interior of the tub 14.

A fill level sensor 50 is disposed interiorly of the tub 14 and is illustrated in FIG. 1 as mounted on the undersurface of lid 44. In the presently preferred practice of the invention, the sensor 50 comprises a sound level detector in the form of an acoustic transducer which emits a beam of sound into the interior of the tub and reflects the signal from the surface of the articles of apparel 18 and/or the surface of the fluid fill 52.

An alternative location for the fill level detector is indicated by reference numeral 54 and is attached to the exterior of the tub 14 for vibrating the tub wall, and is thereby non-intrusvie.

A turbidity sensor indicated generally at 56 is disposed in the drain line 30 between the tub and the pump 32, and employs optical techniques, as hereinafter will be described in greater detail, for sensing the turbidity or soil condition of the washing fluid.

It will be understood that the tub cover or lid 44 is connected to the top deck 36 of the cabinet by suitable hinged arrangement (not shown); and, the lid 44 may be raised to permit user access for loading and unloading the basket 16.

Figure 2:
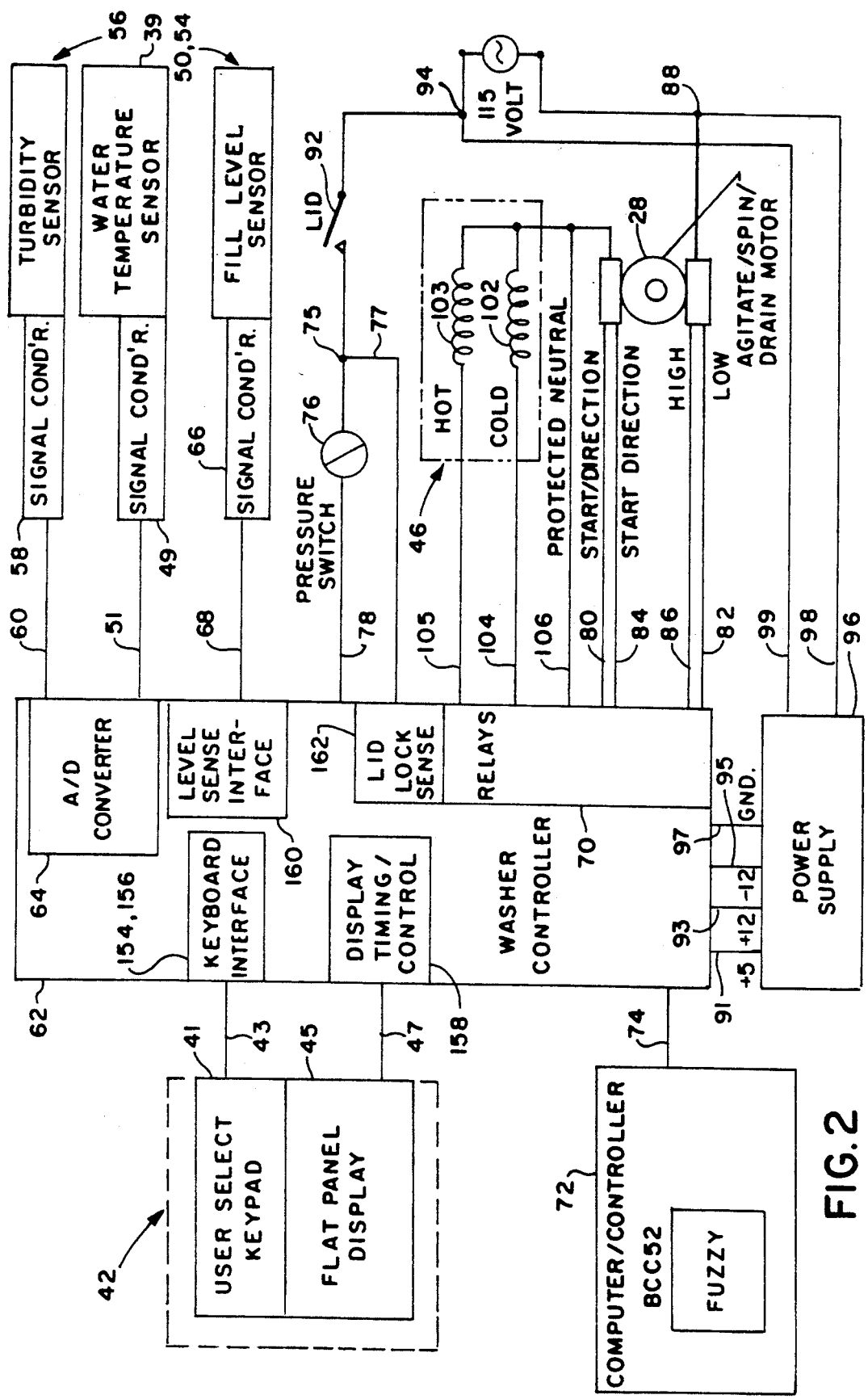
FIG. 2 is a block diagram of the components of the control system for the machine of FIG. 1.

Referring to FIG. 2, the turbidity sensor 56 includes signal conditioning circuitry 58 and is connected by 60 to washer controller 62 which has an analogue-to-digital sensor signal conversion section 64. Similarly, a water temperature sensor and conditioning circuit 39, 49 provides a signal to the analogue-to-digital 64 along lead 51.

Fill valve 46 includes a water temperature sensor 39 and signal conditioning circuitry 49 which is connected to an input of A/D converter 64 along lead 51. Fill sensor 50 or 54 includes a signal conditioning circuit 66 which is connected to washer controller 62 by lead 68. The washer controller 62 also includes a relay section 70.

A micro-computer based controller 72, which in the present practice comprises a Micromint BCC52 device, is connected to washer controller along line 74 for performing logic operations for washing machine control.

The agitate/spin/drain motor 28 is energized by the relay section 70 along lines 80 or 84 and 106 for "START", lines 82 and 106 for "LO" speed and along lines 86 and 106 for "HIGH" speed, where lead 106 is a protected neutral. The motor is connected through an internal overload relay (not shown) to power line junction 88, which is connected to the opposite side of the 115 volt supply from junction 94. Overload relay motor is also connected to neutral junction 90.

A pressure switch 76 is connected to the relay section 72 by lead 78 and is in series with lid open switch 92, which is connected to junction 94 on one side of a 115 volt supply. A pressure switch by-pass line 77 to the controller 62 is provided via junction 75 in the power line and provides lid lock switch position monitoring.

The washer controller 62 has a power supply 96 which provides +5 volts to controller 62 along line 91, +12 volts along line 93, −12 volts along line 95 with ground lead 97. The power supply 96 is connected to power line junctions 88, 94 respectively along lines 98, 91.

User controls 42 include a user select keypad 41 connected to controller 62 along line 43 and flat panel display 45 connected to controller 62 along line 47.

Figure 12A:
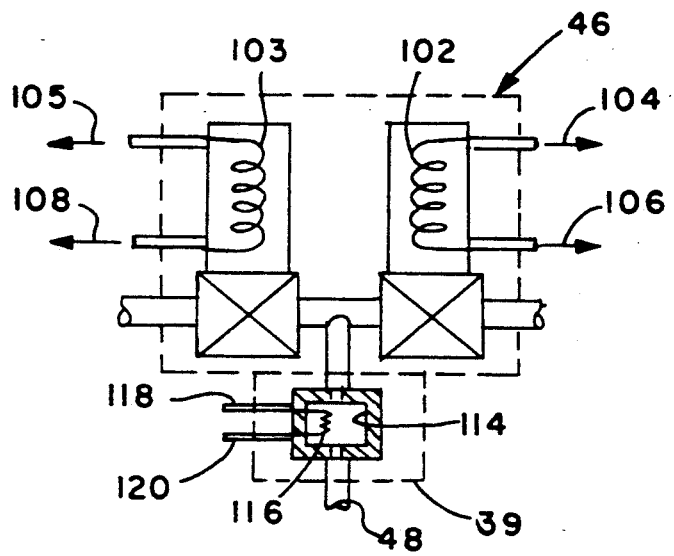
FIG. 12a is a schematic of the waterfill valve and temperature sensor.
Figure 12B:
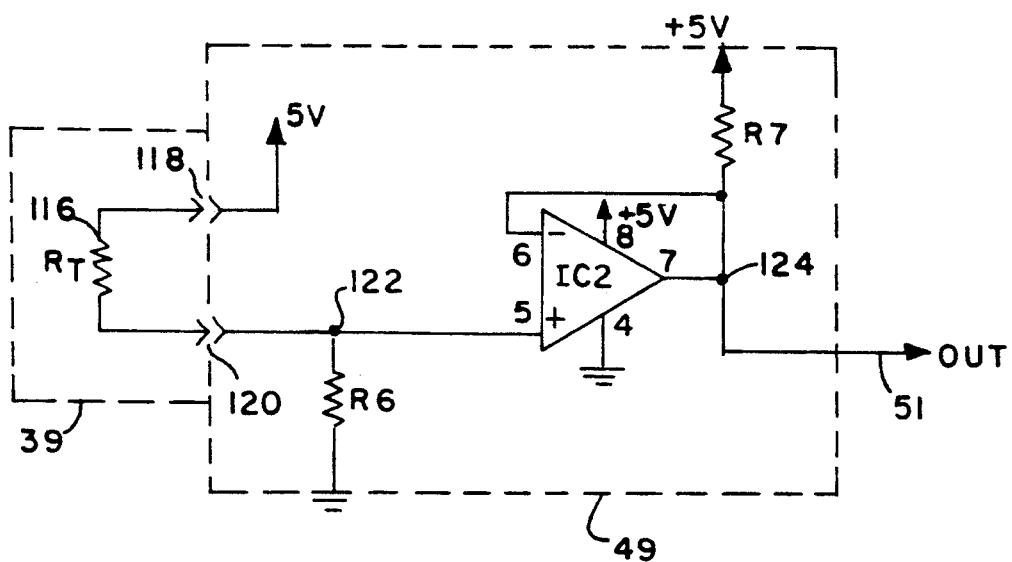
FIG. 12b is an electrical schematic of the temperature sensor and signal conditioner.

Fill valve 46 includes a hot water solenoid coil 103 receiving power along line 105 from relay section 70 and connected to neutral power junction 90. Valve 46 also includes a cold water solenoid coil 102 receiving power along line 104 from relay section 70 and connected also to neutral junction 90 and lead 106. 10 Referring to FIGS. 12a and 12b, the water valve 46 has the water temperature sensor 47 provided in the outlet tube 48. The sensor comprises a chamber 114 formed in the valve outlet and may be either integral with the valve housing or separately therefrom, which chamber has a thermister 116 disposed therein with the electrical leads 118, 120 extending therefrom and adapted for connection thereto at connectors 118, 120, as shown in FIG. 12b. In the present practice, the thermister comprises a FENWAL type 136-503KAG-JO1 device, having a resistance of 50K Ohms at 25° C. Connector 120 is connected to junction 120, which is grounded through R6 and is also connected to the positive input of amplifier IC2, which has its output connected to output junction 124. Junction 124 is connected to a 5 volt supply through R7 and also to the negative input of IC2. The output of IC2 at pin 124 is applied to the A/D converter 64 for use by the microprocessor 72, and provides an electrical indication of the temperature of the water entering the tub 14.

Figure 4A:
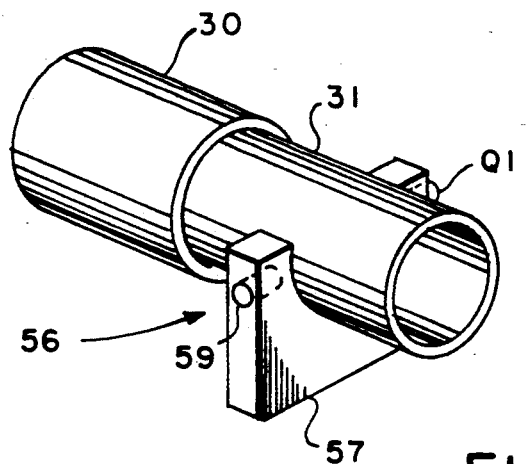
FIG. 4 is a detail of the turbidity sensor of the system of FIG. 1.
FIG. 4b is a schematic of the turbidity sensor signal conditioner.

Referring to FIG. 4a, the drain tube 30 has a section thereof 31 formed of transparent material such as glass or plastic, and which is partially surrounded by the turbidity sensor 56, which includes a mounting block 57 having a light-emitting diode 59 disposed therein on one side of the transparent section 31. A photo-detecting device Q1 is disposed diametrically opposite LED 59 on the other side of the transparent section 31 for receiving light from the LED 59 which passes through the section 31 and the wash fluid contained therein.

Figure 4B:
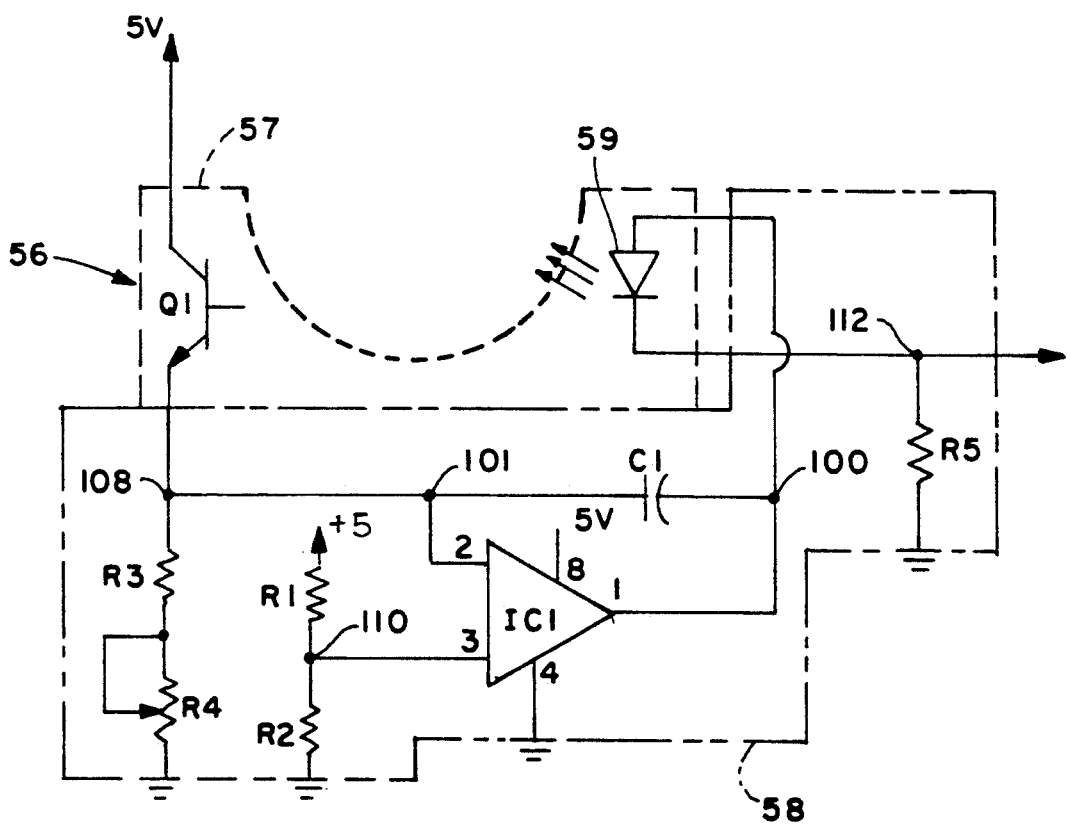

Referring to FIG. 4b, the LED or transmitter device 59 is an infrared emitting diode which is driven by the output of an operating amplifier IC1 via junction 100 which also provides a feedback signal through capacitor C1, which is connected to junction 101 and also to pin 2 of IC1. The remaining input of IC1 at pin 3 receives power from junction 110, which comprises a voltage divider connected through R1 to a 5 volt supply voltage, and through R2 to ground.

Junction 101 is connected to junction 108, which is connected through R3 and variable resistance R4 to ground. Junction 108 is also connected to the emitter Q1 which receives at its collector power from a 5 volt supply. The amplifier IC1 is a high-gain device such that a decrease in the collector current of Q1 due to increased water turbidity (increased soil), causes the amplifier IC1 to increase the voltage at its output to LED 59 in order to maintain a balanced condition at its inputs. R4 is adjustable to set the sensor gain. The output of the sensor 56 is at junction 112, which is connected to the negative terminal of LED 59, and also grounded through R2. The voltage at junction 112 is applied to the A/D connector 64 as an indication of turbidity in the wash fluid. In the presently preferred practice, the photodetector Q1 comprises an OP805 NPN phototransistor device and LED 59 comprises a LN51L device available from Panasonic.

Values of resistors and capacitors and integrated circuit component identifications are given in table 1 below.

TABLE 1

| ITEM No. | RESISTANCES OHMS | ITEM No. | CAPACITANCES: μ FARADS | OTHER DEVICES | TYPE |
|---|---|---|---|---|---|
| R1 | 390K | C1 | 0.1 | IC1 | LM358 |
| R2 | 100K | C2 | 0.01 | Q1 | |
| R3 | 5.1K | C3 | 0.001 | IC2 | LM358 |
| R4 | 100K | C4 | 0.330 | | |
| R5 | 330 | C8 | 0.1 | | |
| R6 | 27K | | | U1, U3 | 74AHCT373 |
| R7 | 3.3K | | | U4 | ICM 755 |
| RT | 50K @ 25° C. | | | U5 | ADCO 808 |
| R8 | 10K | | | U8, 10 | 74HCT373 |
| R9 | 10K | | | U11 | ULN2003 |
| R10 | 1.0K | | | U13A, B, C | 4049 |
| R15 | 940 | | | U14A, B | 4082 |
| R16 | 4.7K | | | U15A | 4081 |
| R17 | 19K | | | U16 | 4013 |
| R34 | 68K, 1/2W | | | U17 | 4060 |
| R36 | 100 | | | U20 | VM48X |
| R38 | 100K | | | U22 | 4N36 |
| R39 | 12K | | | U23B | 74HC14 |
| R40 | 10K | | | U24 | MC14040 |
| | | | | U25 | MC14023 |
| | | | | U26 | MM74C14 |
| | | | | D27, 28 | IN4148 |
| | | | | U29 | MC14553 |
| | | | | U30 | 4024 |
| | | | | 210 | 4001 |
| | | | | U31, 32 | 4029 |

Figure 13A:
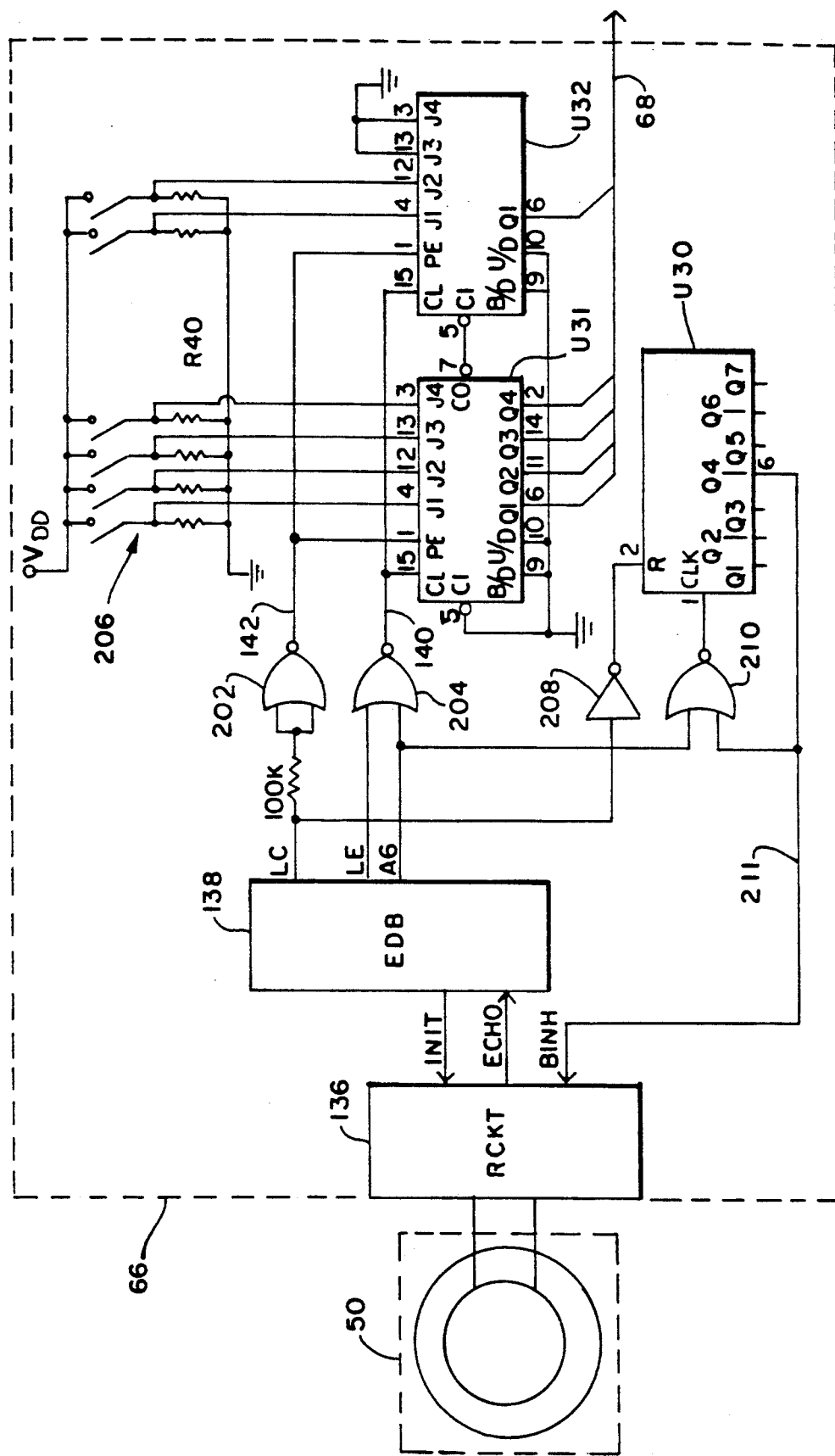
FIG. 13a is a schematic of the fill level sensor and signal conditioner.
Figure 13B:
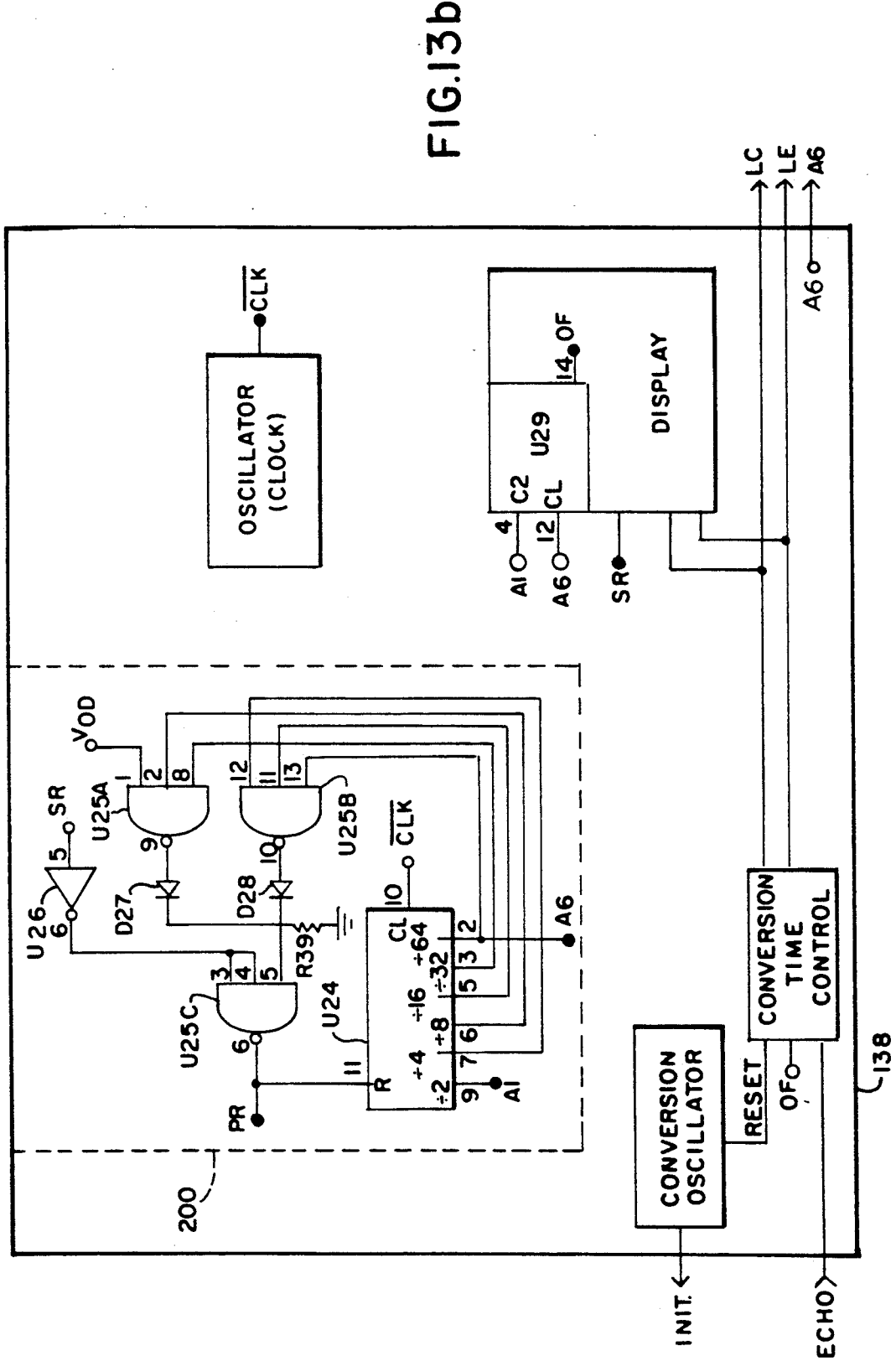
FIG. 13b is a modification of the manufacturer's electronic demonstration board (EDB)

Referring to FIGS. 1 and 13, the fill level sensor 50 is illustrated in the form of an ultrasonic transducer which, in the present practice, is an electrostatic transducer having a usable transmitting frequency range of 20–100 KHz, and a corresponding usable receiving frequency range, with a minimum transmitting sensitivity at 50 KHz of 110 db and a minimum receiving sensitivity at 50 KHz of −42 db. The transducer employed requires 150 volts supply for operation, and has a diameter of approximately 1.7 inches and a thickness of ⅜ inch. The aforesaid transducer is available with a separate ranging circuit board RCKT bearing the manufacturer's designation 6500 Series, and an electronic demonstration board EDB is available as a kit from Polaroid Corporation, 119 Windsor St. - 2B, Cambridge, Mass. 02139. The EDB is modified according to FIG. 13b and is incorporated in the circuit FIG. 13a.

Referring to FIG. 13b the EDB board 138 is modified to have a period of 148.8 microseconds per cycle to provide the count rate of one pulse per inch of distance from the sensor to the surface from which the sound is reflected. A frequency divider 200 includes U24 which is configured with feedback and is the timing clock for the signal conditioning. The network comprising U25A,B,C and R39 and diodes D27, D28 provides feedback for the divider circuit and is reset when a count of 62 is reached. U29 is a counter providing a binary coded decimal output used in display circuitry connected to inputs A1 and A6 of U24.

Referring to FIG. 13a, EDB 138 provides outputs LC, LE, A6 to NOR gates 202, 204 respectively which provides signals along lines 142, 140 to down counters 144, 146. Counters 144, 146 provide outputs along line 68 to level sense interface 160.

Resistor-switch network 206 provides a presetable input indicative of the maximum distance or empty tub. Inverter 208 and NOR gate 210 provides inputs to binary counter U30. U30 outputs the BINH signal along line 211 to the RCKT circuit board to allow short range sensing.

The electronic demonstration board, EDB, and ranging circuit board RCKT are denoted 138 and 136, respectively in FIG. 13a, and which form a part of the signal conditioning circuitry 66. The ranging board 136 is available from the manufacturer, bearing part number 615077. The board 138 provides a digital readout, and displays measured distances at the rate of five times per second in tenths of feet, and has a range of 0.5 feet to 35.0 feet. The output of the EDB board 138 is provided along lines 140 and 142 to the input of dual latches 142,144, which in the present practice of the invention comprise dual 4029 devices which provide an output to the washer controller 62 along line 68. The output on line 68 is a binary coded decimal indication of load level depth in the tub 14.

It will be understood that other suitable ultrasonic devices may be employed with similar sensitivity in the frequency range employed.

Figure 6B:
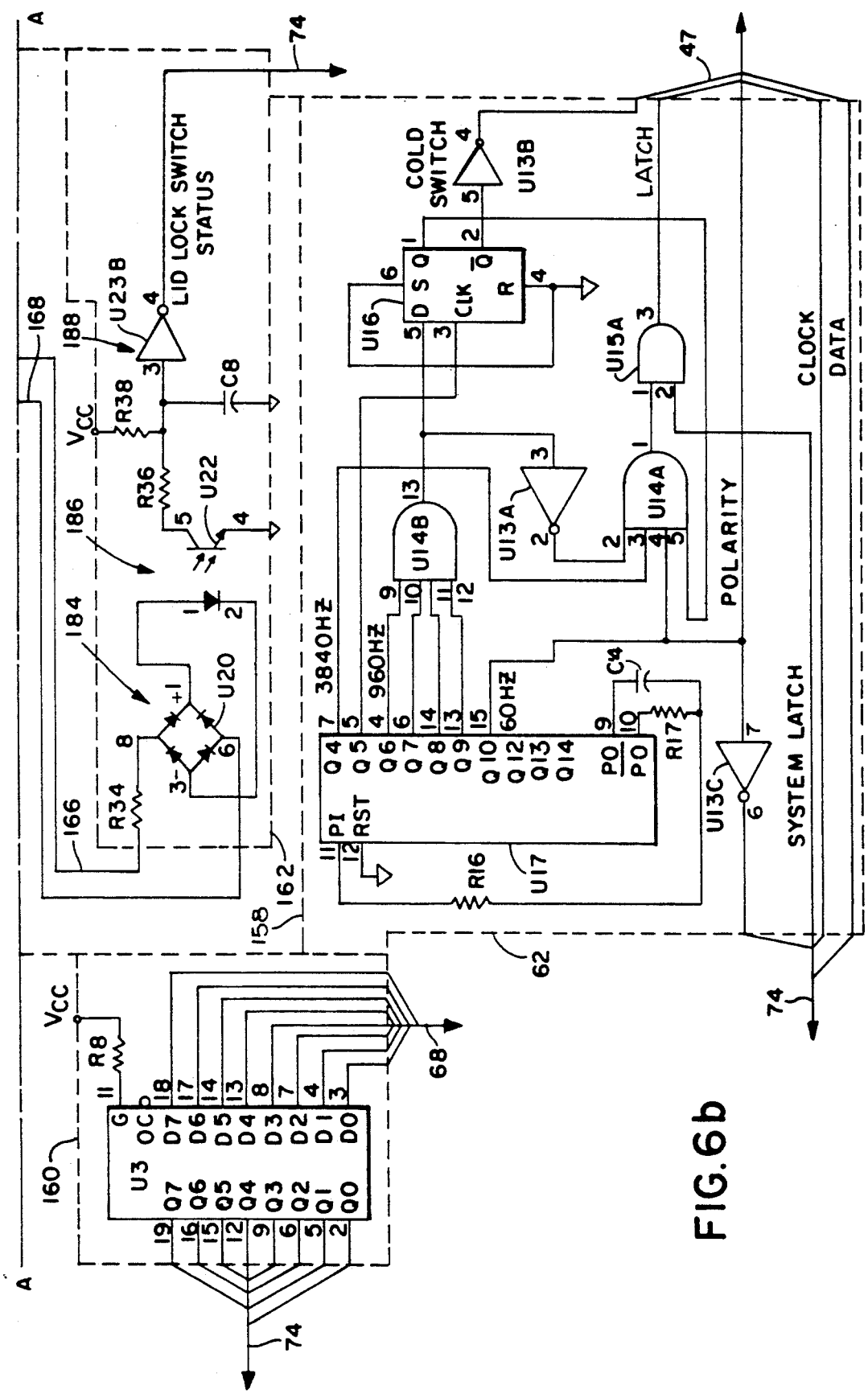
FIG. 6b is the remainder of the electrical schematic divided along line A—A.

Referring to FIGS. 6a and 6b the analog turbidity signal from sensor 56 is provided along line 60 to the eight byte A/D converter 64 comprising devices U4 and U5 which provides the digital signal on line 74 to the micro-computer/controllers 72 which uses the signal for computations according to mode option 3 for automatic wash time determination as will hereinafter be described.

The water temperature signal from sensor 47 is received from the signal conditioner 49 along 51 to device U5 of the A/D converter 64 which provides a digital signal along 74 to the microcomputer/controller 72 which uses the temperature signal for thermal energy computations during machine operation in mode option #1 (DOE) type operation as will hereinafter be described.

The fill level sensor 50, 54 provides a digital signal along line 68 to interface 160 which comprises device U3 which serves as a buffer to provide the water fill signal along line 74 to microcomputer/controller 72 for enabling the fill level computation required in the Auto Fill Mode Option #2 of the machine operation and also in the Fuzzy Mode Option #3, for wash time computations as will hereinafter be described.

The user selects the mode either standard or options 1, 2 or 3 or any combination thereof which activates the machine for functioning according to Table II.

The user select keypad 41 provides a digital output along line 43 to keyboard interface 154, 156 which comprises keypad output latch U8 and keypad input buffer U1 which provide outputs along line 74 to microcomputer/controller 72 which uses the selections to provide buffer U13B along line 47 to display panel 45. System latch, clock and data signals are received along line 74 from the microcomputer/controller 72 and the clock and data signals applied to the section 158.

Figure 3:
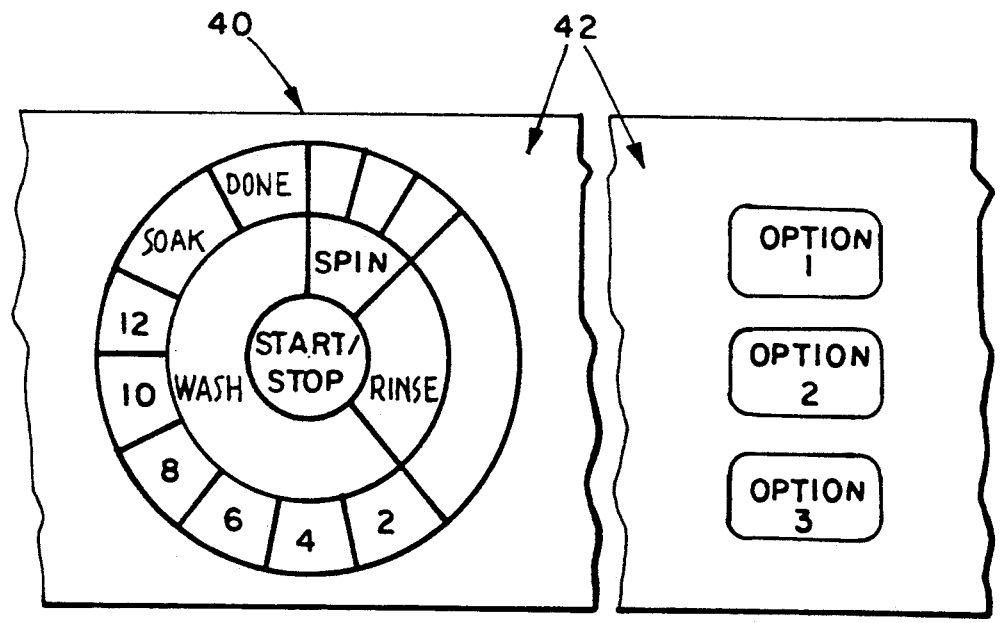
FIG. 3 is an enlarged portion of the control panel of the machine of FIG. 1.

With reference to Table II below, the machine has four modes of operation: Standard, Fuzzy Logic, Autofill, and Energy Limiting or DOE. With reference to FIG. 3, the Standard Mode is selected by the user touching the "START" area on the panel, the Fuzzy Mode is selected by touching the Option 3 area, the Autofill Mode is selected by touching the Option 2 area, and the Energy Limiting or DOE Mode is selected by touching the Option 1 area. Any combination of options may also be selected; and, for the various combinations of modes, the various machine functions enabled for the washing program are indicated in Table II.

TABLE II

| USER OPTION SELECTION | | | | OPERATING FUNCTION/SENSOR | | | |
|---|---|---|---|---|---|---|---|
| (DOE) #1 | (AF) #2 | (FUZZY) #3 | MODE | THERMAL ENERGY LIMIT | FILL LEVEL SENSOR | WASH TIME | TURBIDITY SENSOR |
| 0 | 0 | 0 | STANDARD | N/A | USER | USER | N/A |
| 0 | 0 | 1 | FUZZY | N/A | USER | MACHINE | USED |
| 0 | 1 | 0 | AUTOFILL | N/A | MACHINE | USER | N/A |
| 1 | 0 | 0 | DOE | MACHINE | USER | USER | N/A |
| 0 | 1 | 1 |  | N/A | MACHINE | MACHINE | USED |
| 1 | 1 | 0 |  | MACHINE | MACHINE | USER | N/A |
| 1 | 0 | 1 |  | MACHINE | USER | MACHINE | USED |
| 1 | 1 | 1 | FULL AUTO | MACHINE | MACHINE | MACHINE | USED | the proper mode and sequence of machine function. The internal programming of the microcomputer will be discussed hereinafter in greater detail.

A microcomputer/controller 72 provides machine function signals in digital form along line 74 to relay latch 152 comprising device U10 which provides output signals to power driver 150 which comprises device U11. Driver U11 energizes the various output function electromechanical relays 170–182 in relay section 70.

Relay 170 provides pressure switch bypass along line 77 during the tub "SPIN" operation. Relay 172 provides power to the hot water coil 103 of valve 46 along line 105; and relay 174 provides power along lead 104 to cold water coil 102 of valve 46 with the coils commonly connected to the system neutral or ground along line 106.

Relay 180 provides power to one coil of motor 28 for Low Speed operation along line 82; and relay 182 provides power along line 86 to a second coil of motor 28 for High Speed operation. Motor start is empowered by either of relays 180, 182 along leads 82, 86. Motor direction is controlled by relays 176, 178 along leads 80 and 84.

Lid lock sense section 162 rectifies the power line voltage along leads 166, 168 in rectifier diode bridge U20 indicated generally at 184 which drives an optical coupler indicated generally at 186 comprising a light emitting diode and photo detector U22 the output of which drives a buffer indicated generally at 188 and comprising device U23B which provides a digital output lid open signal along line 74 to microcomputer/controller 72.

Figure 11:
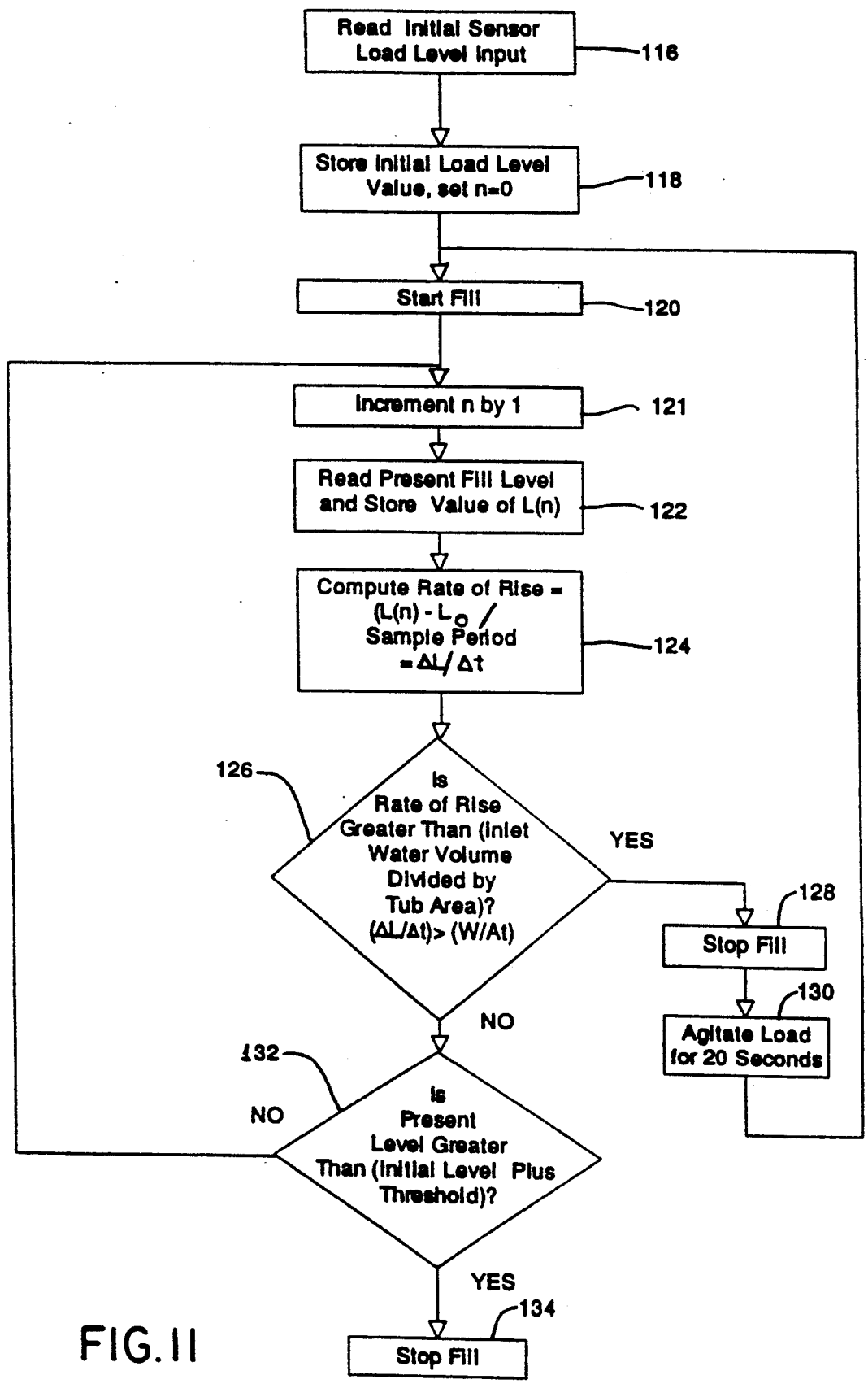
FIG. 11 is a block flow diagram of the Autofill mode function of the system of FIG. 2.

Display timing/control 158 receives control signals along line 74 from the microcomputer/controller 72 and provides outputs along line 47 to flat panel display 45. Control 158 comprises counter U17 providing timing signals to gates U14A and U14B. The output of U14B provides signals to buffer comprising U13A, and latch U16. The output of latch U15A is applied through With reference to the Autofill Mode of operation, the controller 62 responds to the user selection of Option 1 as shown in FIG. 11 and reads the fill sensor output to measure the initial load level at step 116. The initial load level value L(0) is then stored in memory at step 118. The fill valve 46 is then energized at step 120, and the fill level sensor signal is again read and stored at step 122. The rate of rise $\Delta L/t_{fill}$ is then computed at step 124 by subtracting the initial value L(0) from the present level and dividing by the fill time. A test is then made of the rate of rise to determine whether it is greater than inlet water volume divided by tub area at step 126. If the rate of rise is greater than inlet water volume divided by tub area, the fill valve 46 is shut off at step 128 and the agitator motor is energized for 20 seconds at step 130 and the program returns to step 120. If the rate of rise $\Delta L/t_{fill}$ in step 126 is not greater than inlet water volume divided by tube area, then the present level is tested to determine whether it is greater than the initial L(0) plus a predetermined threshold, which in the presently preferred practice is two inches, and if such is the case, the fill valve is shut off at step 134. If, however, the present level at step 132 is not greater than the initial level plus two inches, then the program returns to step 121.

Referring to FIG. 3 and Table II, if the user selects Option 3, the machine operates in the "Fuzzy" mode, and automatically determines the wash time based upon inputs to the microprocessor from the fill level sensor 50, 54 and the turbidity sensor 56.

The manner in which the machine determines the wash time by Fuzzy Logic or Fuzzy Inference will now be described with reference to FIGS. 7 through 10 and Table III.

TABLE III

| TURBIDITY | FILL | WASHTIME |
|---|---|---|
| HI (.30) | LO (.74) | ME (.30) |
| ME (.67) | LO (.74) | ME (.67) |
| HI (.30) | ME (.25) | HI (.25) |
| ME (.67) | ME (.25) | ME (.25) |

Assuming a turbidity sensor digitized output $xT=140$ units out of a full scale output of 255 units; and, assuming a fill level sensor digitized output $xF=95$ units also out of a full scale output of 255 units; as representative of typical values of turbidity and fluid fill level.

Figure 7:
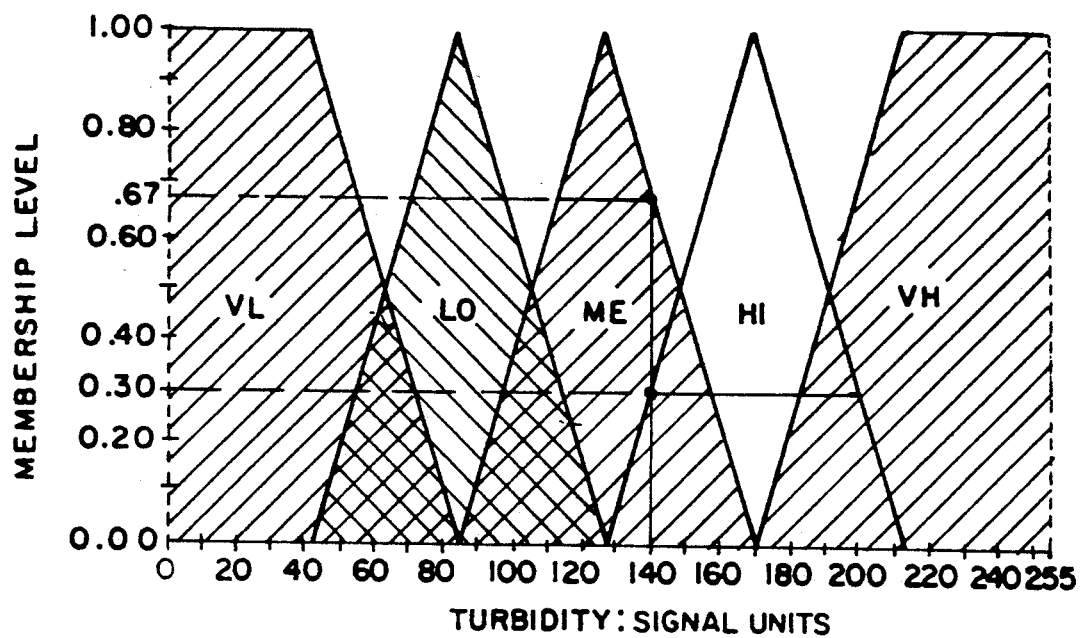
FIG. 7 is a plot of the membership level versus unit signal output for the turbidity sensor of FIG. 2.
Figure 8:
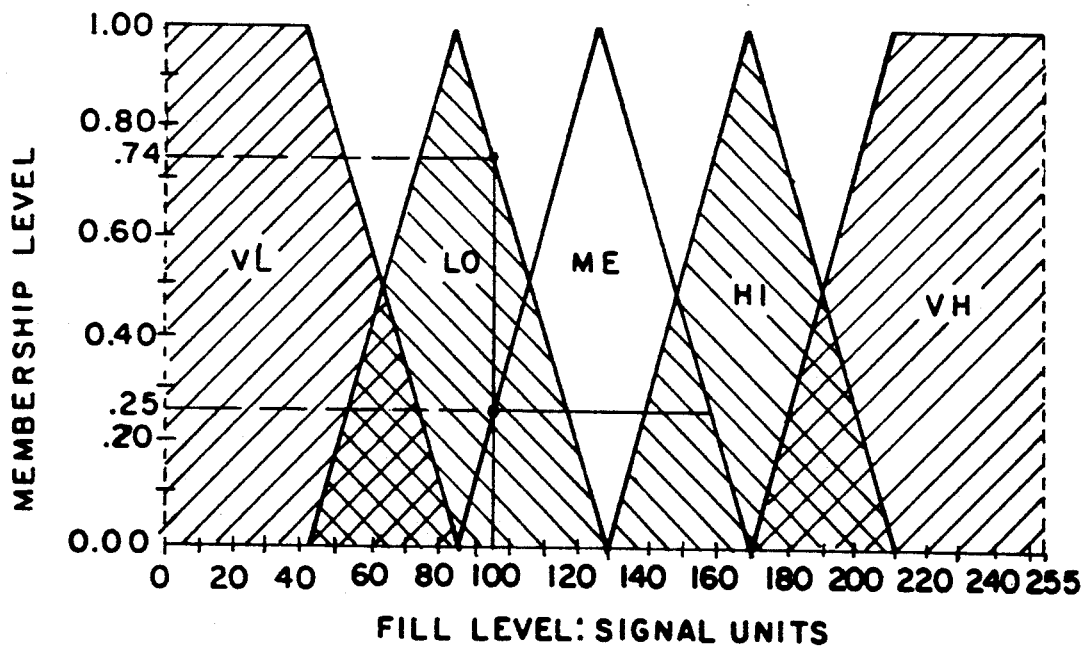
FIG. 8 is a graph of membership level plotted as a function of a signal output for the fill level sensor of FIG. 2.

Referring to FIG. 7, the full scale value of the turbidity is signal plotted along the abscissa, and is subdivided into five (5) bands of turbidity having a width of about 85 signal units at the base, with the bands overlapping to the midpoint thereof, and the two end bands forming trapezoids. The entire scale of turbidity signal is conveniently divided into five (5) bands, with the central three representing values of Low (LO), Medium (ME), and High (HI) of the turbidity signal, and the end bands representing Very Low (VL) and Very High (VH) readings. FIG. 7 is entered on the signal unit axis at the value $xT=140$, and it is determined that the membership level on the ordinate axis corresponding to 0.3 is obtained for the High band, and a value of 0.67 for the Medium band. Referring to FIG. 8, the fill level signal $xF=95$ is entered on the signal unit axis, and the membership level determined from the ordinate axis to have a value of 0.25 for the Medium band, and a value of 0.74 for the Low band.

Figures 9, 10:
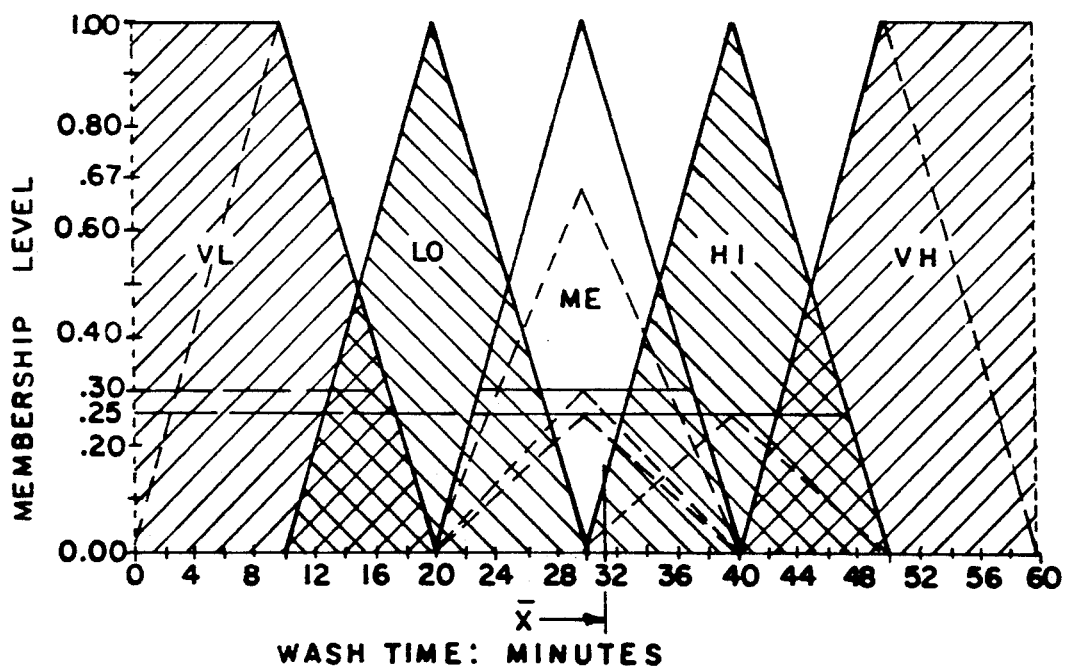
FIG. 10 is a graph of membership level plotted as a function of wash time for the results obtained from the matrix of FIG. 9 for given turbidity and fill level signals.

A set of rules or governing criteria for the "sense" or meaning of the membership level derived from FIGS. 7 and 8 is then correlated with respect to Wash Time by dividing the full scale interval of Wash Time into five (5) bands in a manner similar to the way the signal output for turbidity and fill level were subdivided; and, this is shown graphically in FIG. 10, where the full scale Wash Time of 60 minutes has been subdivided into five bands overlapping at their midpoint, with a base of 20 minutes. The center three bands are isosceles triangles representing values of Low (LO), Medium (ME), and High (HI) for Wash Time, and the end bands are trapezoidal, representing values of Very Low (VL) and Very High (VH) times for washing. The "sense" or rules governing the relationship between Wash Time and various values of turbidity and fill level for the chosen bands are presented in FIG. 9 in matrix form.

The band intercepts obtained from FIGS. 7 and 8, when entered into FIG. 9, yield four conditions of Wash Time which are shown as cross-hatched in FIG. 9, and comprise 3 medium level Wash Time values and one High level Wash Time value. With reference to Table III, the combinations of Wash Time FIG. 9 represented by the cross-hatched squares are shown in tabular form with the corresponding numerical value of Membership function indicated for the data pairs of fill level and turbidity obtained from FIGS. 7 and 8. The resultant value of Membership function listed for each corresponding Wash Time band are based upon the rule of AND LOGIC, i.e., where plural values are encountered on any one band, the minimum, or least value, is chosen. These values are indicated in the column headed "Wash Time" in Table III. Each of the Membership levels listed in Table III is entered for its corresponding Wash Time band in the graph of FIG. 10; and, the ordinate value of Membership level is projected to the corresponding band as shown by the horizontal intercepts for the Medium and High bands in FIG. 10. It will be noted that there are three intercepts for values of 0.67, 0.30, and 0.25 for the Medium band; and, a single intercept for the value of 0.25 for the high band in FIG. 10.

It is now desired to determine the centroidal location of the areas under the band intercepts denoted x which is the intercept on the Wash Time axis of the projection of the centroid of the areas under the intercepts of the bands.

By taking the sum of the static moments of the areas about the origin, x may be determined from the expression $$x = \frac{\Sigma A_I x_I}{\Sigma A} = \frac{A_{ME} x_{ME} + A_{HI} x_{HI}}{A_{ME} + A_{HI}}$$

For the sake of simplification, it is assumed that the trapezoidal areas in each band width under the intercept may be represented equivalently by a triangle having the same height as the intercept and same base width as the band. The triangles are shown for the area under each intercept by dashed line in FIG. 10. This simplifies the area calculations wherein the area of each triangle is employed instead of the area of corresponding trapezoid. Noting that the band width center for the medium band is $x_{ME}=30$, and for the high band $x_{HI}=40$, x is then determined from the expression.

$$x = \frac{(A_{.67} + A_{.30} + A_{.25}) x_{ME} + A_{HI} x_{HI}}{A_{.67} + A_{.30} + A_{.25} + A_{HI}},$$

Where $A_{.25} = \frac{1}{2}bh = \frac{1}{2} \times 20(.25) = 2.5;$
$A_{.67} = \frac{1}{2}bh = \frac{1}{2}(20).67 = 6.7;$
$A_{.30} = \frac{1}{2}bh = \frac{1}{2}(20).3 = 3.0;$
$A_{HI} = \frac{1}{2}bh = \frac{1}{2}(20).25 = 2.5;$ $$x = \frac{30(6.7 + 3.0 + 2.5) + 40(2.5)}{(6.7 + 3.0 + 2.5 + 2.5)} = 31.7$$

Thus, it will be seen that for any given pair of values of turbidity and fill level within the range of signals from the fill level sensor and turbidity sensor, the machine microcomputer is capable of being automatically programmed to determine a discrete value of Wash Time by the logic processes described above employing FIGS. 7 through 10.

Referring now to FIGS. 1, 5 and 20 thru 23, an alternate embodiment of the fill level sensor 54 is shown with the electro-acoustic transducer 53 mounted to the exterior of the tub and with the receiver in the form of a condenser microphone or electret 55 mounted under the lid 44 of the machine for detecting the reflection of sound emitted by the transmitter 53. In the present practice the receiver is in the form of a condenser microphone or electret 55 mounted under the lid 44 of the machine for detecting the reflection of sound emitted by the transmitter 53. In the present practice the transmitter 53 comprises an 8 ohm midrange 3 inch speaker and emits a short pulse in the frequency range 2000 to 4000 hertz and preferably 2500 hertz.

Figure 5:
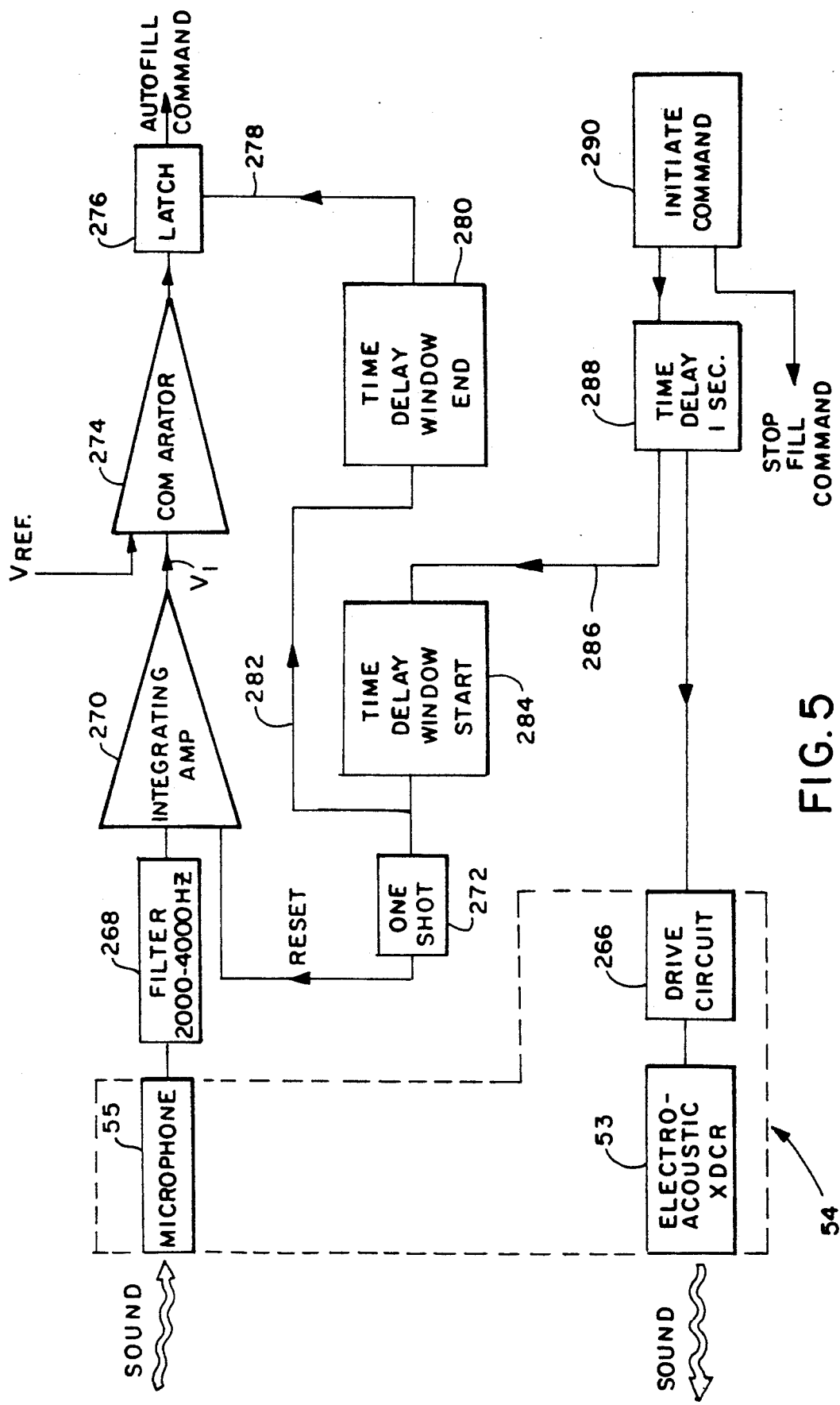
FIG. 5 is a detail of the fill level sensor of the control system of FIG. 2.

Referring to FIG. 5 the electro-acoustic transducer 53 is excited by drive circuit 266 at the above mentioned frequency and the sound is reflected from the interior of the tub and received by the microphone with the output thereof filtered by a suitable filtering circuit 268 to frequencies in the range 2000 to 4000 hertz and the filter output applied to one input, of an integrating amplifier 270 which is reset by a one shot device 272; and, the output thereof is applied to one input as the signal $V_1$, to a comparator which receives at its other input a reference signal $V_r$. The output of the comparator 274 is applied to the input of latch 276 which is enabled along line 278 by a time delay corresponding to the end of a predetermined interval or "window" which is enabled along line 282 by a similar time delay device 284. Time delay device 284 corresponds to the start of the "window" and is enabled along line 286 by a 1 sec time delay device 288 enabled by the user initiation command 290 corresponding to the selection of the Auto fill mode of operation.

Integrating amplifier 270 sums the energy under the positive going portion of the acoustic wave by summing the area thereunder and indicates when this is above or below a threshold given by a reference voltage. The comparator thus determines the amount of energy of the reflected signal during the "window"; and, by comparison with a predetermined threshold a determination is made whether to continue filling by maintaining current to the valve 46 or to stop fill by de-energizing the valve 46.

Figure 20:
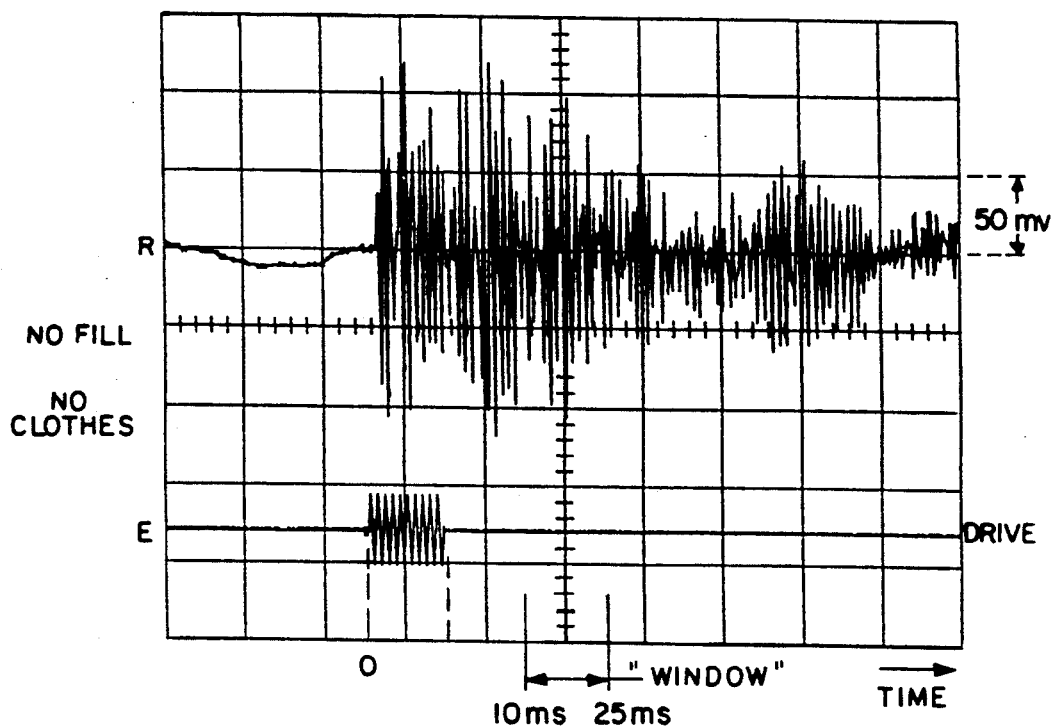
FIG. 20 is a signal trace for the output of the microphone receiver for fill sensor 54 with no fill and no clothes.
Figure 21:
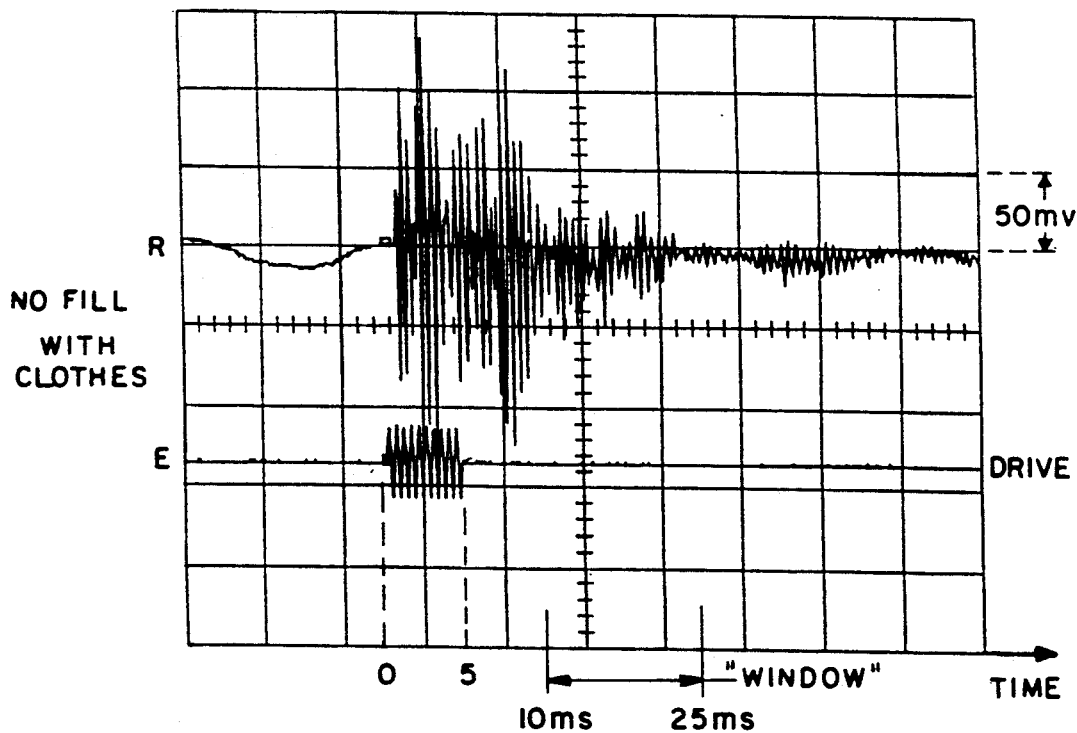
FIG. 21 is a signal trace similar to FIG. 20 with no fill and with clothes.

It has been discovered that there is a significant difference in the energy of the reflected signal if the signal is reflected from dry clothing within the basket 16 as compared to the reflected signal in the absence of clothes. This condition is present as the water level rises above the dry clothes until the point is reached where the clothes are entirely immersed in the water. Referring to FIGS. 20 and 21, the oscillograph trace of the voltage applied to the integrating amplifier from the microphone for the condition of an empty basket in figure 20 and for a condition with clothes in the basket but no water fill are shown. For reference, the drive voltage to the electro-acoustic transducer 53 is shown as a lower trace "E" and time 0 is marked from the beginning of the transmitter pulse which lasts approximately 5 milliseconds. Upon termination of the transmitter pulse and after approximately 5 milliseconds delay, the integrating amplifier 270 sums the positive going signal in the upper trace for the microphone for a period of approximately 15 milliseconds denoted as the "window". It will be seen that the reflected signal shown in FIG. 21 is substantially damped during the "window" as compared to the signal in FIG. 20 with no clothes in the basket.

Figure 23:
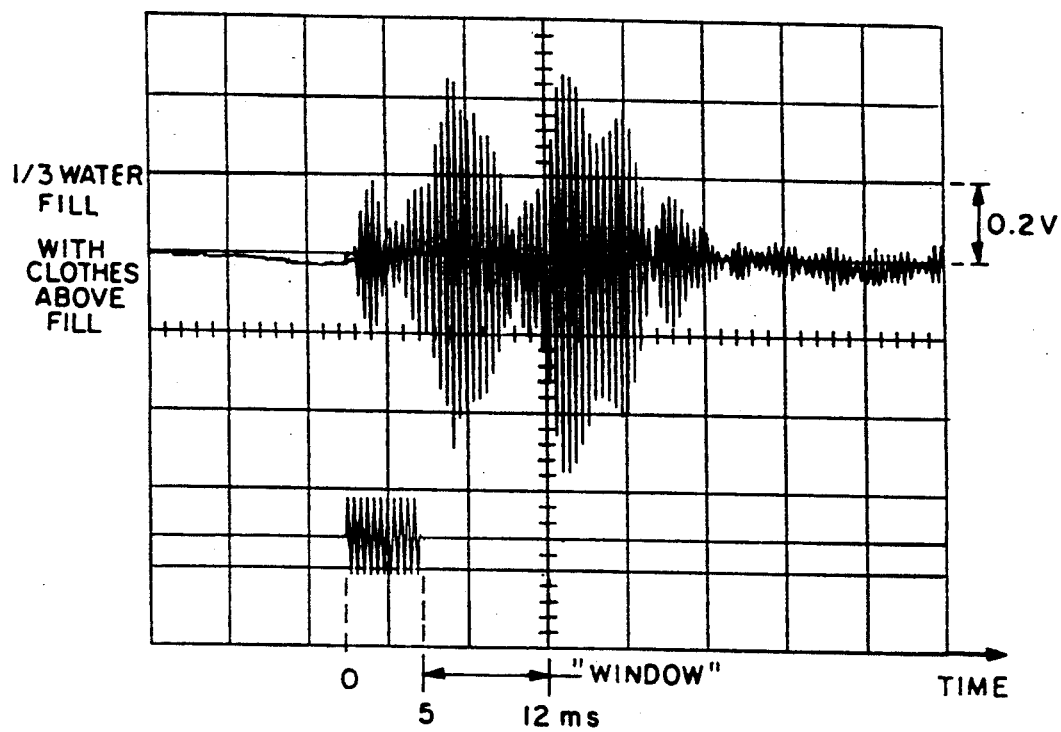
FIG. 23 is a signal trace similar to FIG. 20 with ⅓ water fill and with clothes above fill.
Figure 22:
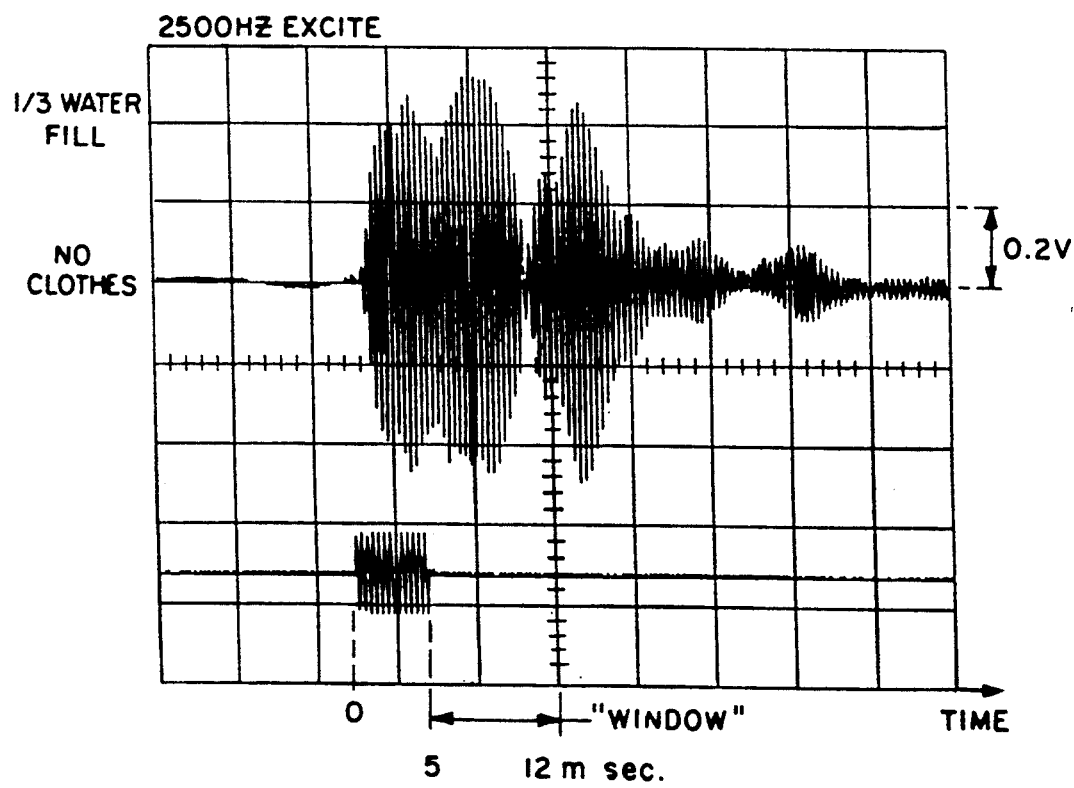
FIG. 22 is a signal trace similar to FIG. 20 with water fill and no clothes.

Referring to FIGS. 22 and 23, traces similar to those of FIGS. 20 and 21 are shown for the condition of no clothes and tub ⅓ filled with water in FIG. 22. In FIG. the tub is ⅓ filled with water and with clothes above fill level. It will be seen from the trace in FIG. 23 that during the 7 millisecond "window" the presence of the clothes substantially dampens the reflected signal to the microphone. Thus it can be seen from FIGS. 20 thru 23 that the presence or absence of clothes can be discerned electrically, irrespective of the presence or absence of the fill in tub 14. This phenomenon enables the machine to determine when sufficient water has been filled in the tub to just immerse the clothes, irrespective of the amount of clothes and therefore can automatically provide the correct amount of water fill for any given size load of clothes to be laundered.

Figure 24:
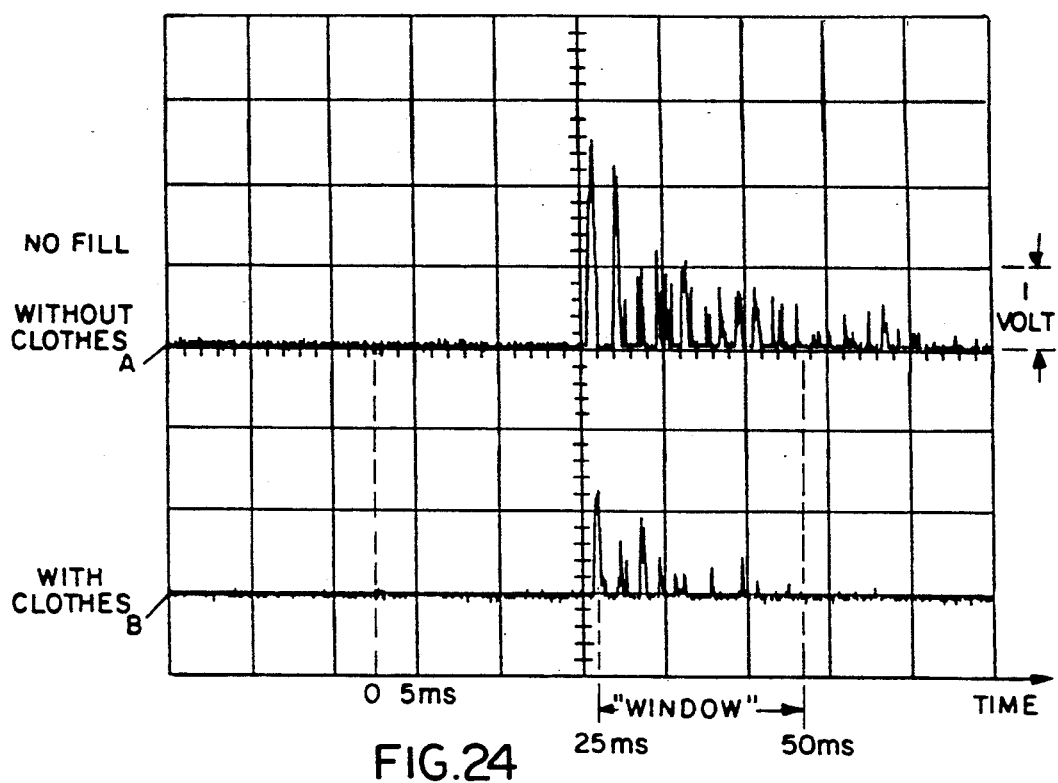
FIG. 24 is a pair of signal traces similar to FIG. 20 for an alternate transducer 53 with no fill and with and without clothes.

It has also been determined that the electro-acoustic transducer 53 may comprise a solenoid with an armature impacting a stop to provide a ringing signal on the tub. In FIG. 24, the receive signal trace for the microphone is shown for a solenoid transmitter for a dry tub for the conditions of no clothing in trace A and with clothing in trace B, from which it will be readily observed that trace B indicates a substantial amount of energy absorbed due to the presence of the clothes and a substantial dampening of signal over the 25 millisecond "window".

Figure 25:
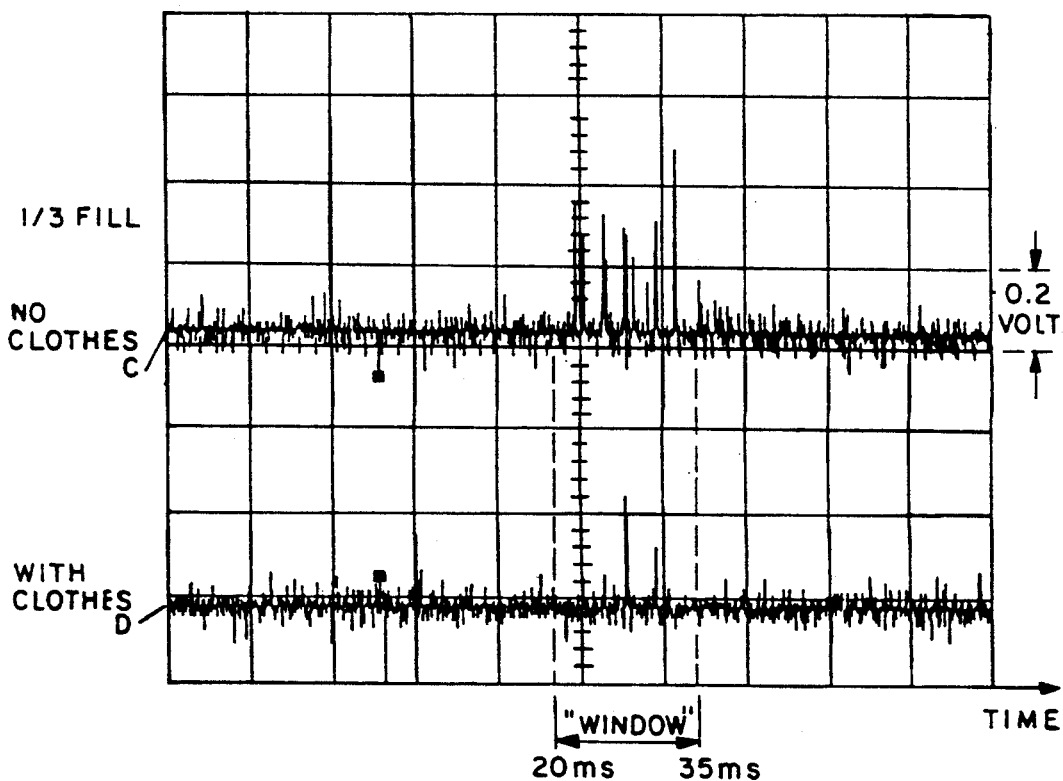
FIG. 25 is a pair of signal traces similar to FIG. 24 for ⅓ fill and with and without clothes; and, FIG. 26 is a block flow diagram for the energy limiting fill control Option 1 mode of machine operation.

Referring to FIG. 25, traces similar to FIG. 24 are shown for a solenoid device substituted for the electro-acoustic transducer 53 for the condition in trace C of no clothes and in trace D of the tub having clothes therein and with ⅓ water fill. It will be seen in trace D that for the 15 millisecond "window" a substantial amount of dampening is present due to the clothes.

The circuitry of FIG. 5 was modified for the use of the solenoid type electro-acoustic transducer 53 by employing a microphone amplifier with a unidirectional output.

In order to provide the appropriate signal gain to determine the change in dampening of the reflected signal due to the presence of clothes, the time constant for the integrating function is computed by using the first signal level obtainable in the tub with no clothes and no water fill and then choosing a convenient voltage level between supply and ground.

The RC product is then selected according to the following expression:

$$RC = \frac{\text{"time of window duration"}^2}{\text{Comparator Voltage}}$$

The R & C are selected so that a capacitance of C is large enough to satisfy the input impedance of the comparator. By way of example from FIG. 20, it is estimated that the average positive going wave is 0.025 volts, with a "window" duration of 25 milliseconds. A comparator voltage of 2.5 volts is chosen and from the above expression for RC, a value of 0.25 milliseconds is obtained. From this a convenient combination would be 0.1 microfarads and 2500 ohms. If a microprocessor type control circuit were employed, the ratio of voltage on the microphone with clothes present, as compared to the voltage with no clothes present, could be used to establish a threshold for water fill valve shutoff at a point where the ratio is in the range of 2–3:1.

Figure 15:
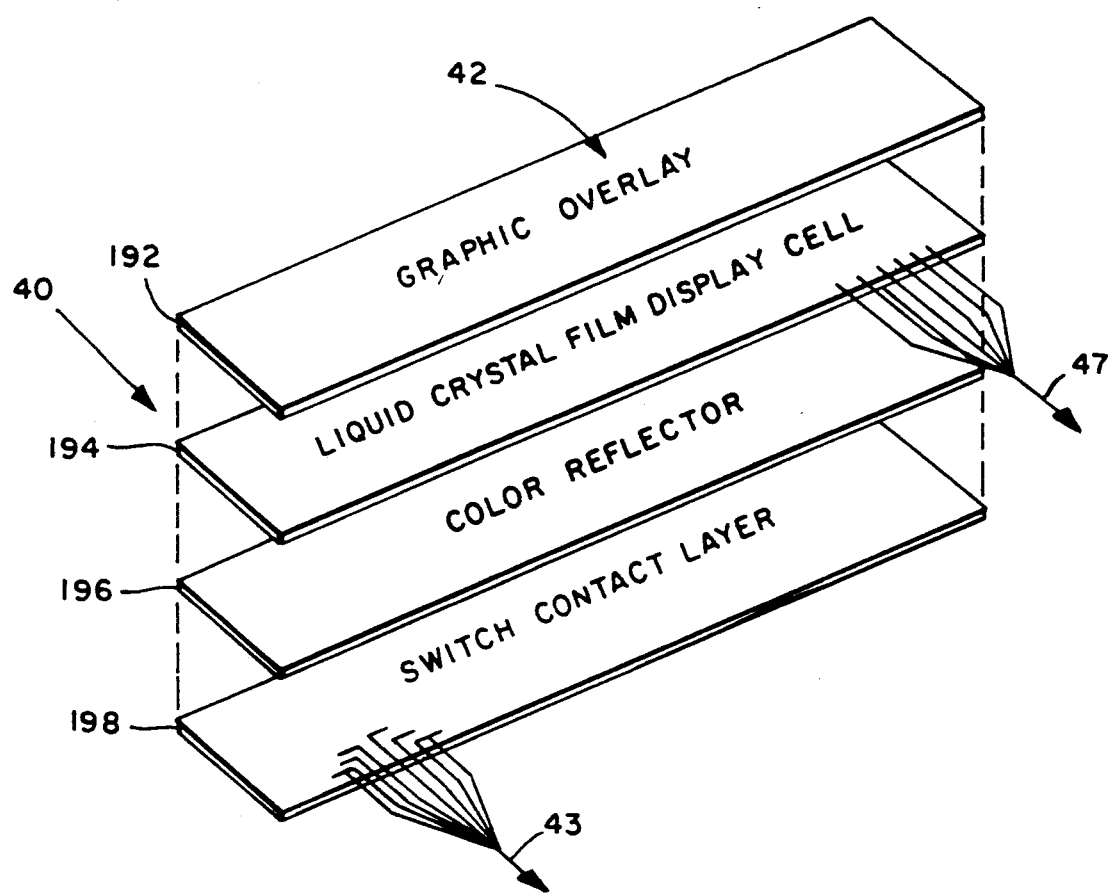
FIG. 15 is an exploded view of the control panel 42.
Figure 16:
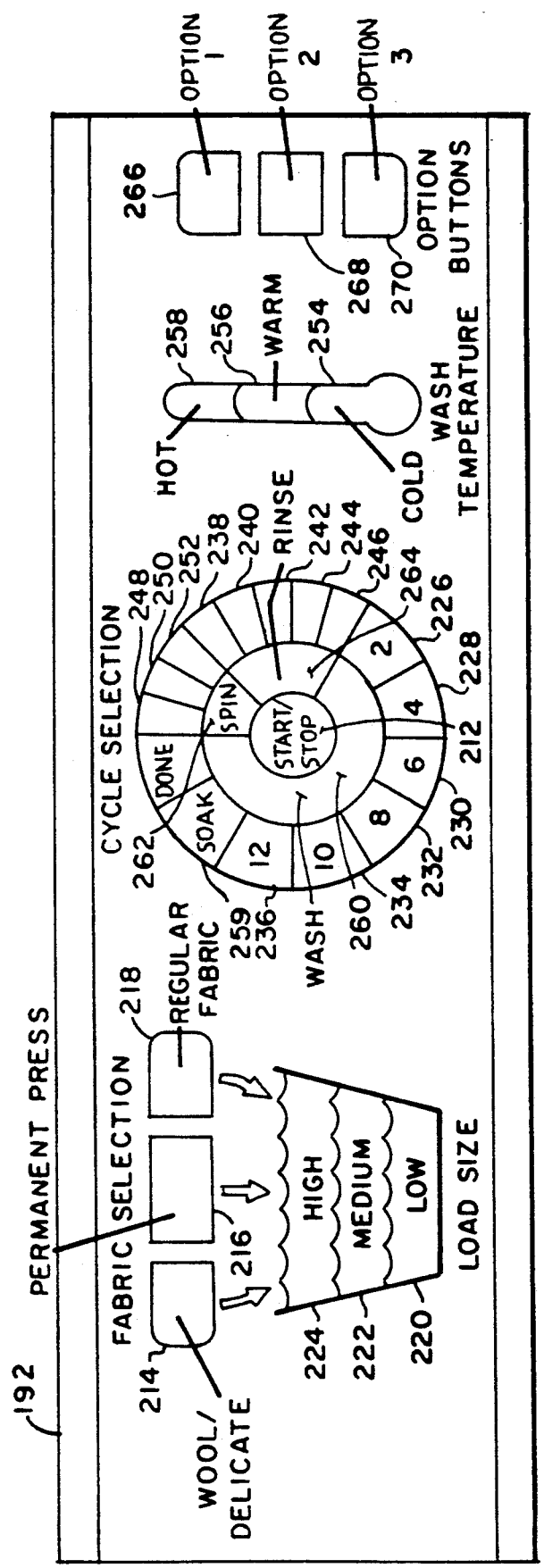
FIG. 16 is a detail of the graphic display layer of the panel of FIG. 15.

Referring to FIG. 3 and 15 thru 19, the Control Panel 40 has control input/display touch area 42 shown in detail in FIG. 16; and, the construction of panel 40 is shown in exploded view in FIG. 15 as comprising on the surface the graphic overlay 192 superposed onto a liquid crystal film display cell layer 194. The layer 194 has the leads for the individual pixels thereof bundled and connected along line 47 to the display timing control 158. The layer 194 is superposed over a color reflector layer 196 which is in turn superposed over a switch contactor layer 198 which has the switch leads thereof bundled and connected along line 43 to the keyboard interface 154,156.

Referring to FIG. 16 the Control Panel input display touch areas are shown in a preferred arrangement in greater detail where the user touches graphic overlay 192 to select the machine mode of operations and functions.

For "STANDARD" mode the user selects one of the fabric inputs, 214, 216 or 218, then one of the load size selections denoted by reference numerals 220, 222 or 224. The user then selects one of the "WASH" times shown in 2 min. increments in areas 226–236, then selects the desired "RINSE" time in 1 min. increments in areas 238-246. The user then selects the desired "SPIN" time in 2 min. increments in areas 248, 250 and 252.

The user selects "WASH TEMPERATURE" from any of areas 254, 265 or 258 but does not select any of the options. If a "SOAK" function is desired, the user touches area 259 and then touches "START" area 212 to start the machine.

For the Thermal Energy Limiting "DOE" mode, the user touches only the "OPTION 1" area and then "START" 212. The user may however select "OPTION 1" and then any other functions desired. For "AUTOFILL" mode of operation, the user need only touch the "OPTION 2" and then area 212 for "START"; however the user may also, if desired, select other machine functions in combination with the "AUTOFILL". For automatic wash time determination, the user need only touch "OPTION 3" area and area 212 for starting the machine. However, if desired the user may also select other machine functions in combination with "OPTION 3". They may also select combinations of options 1-3.

Figure 17:
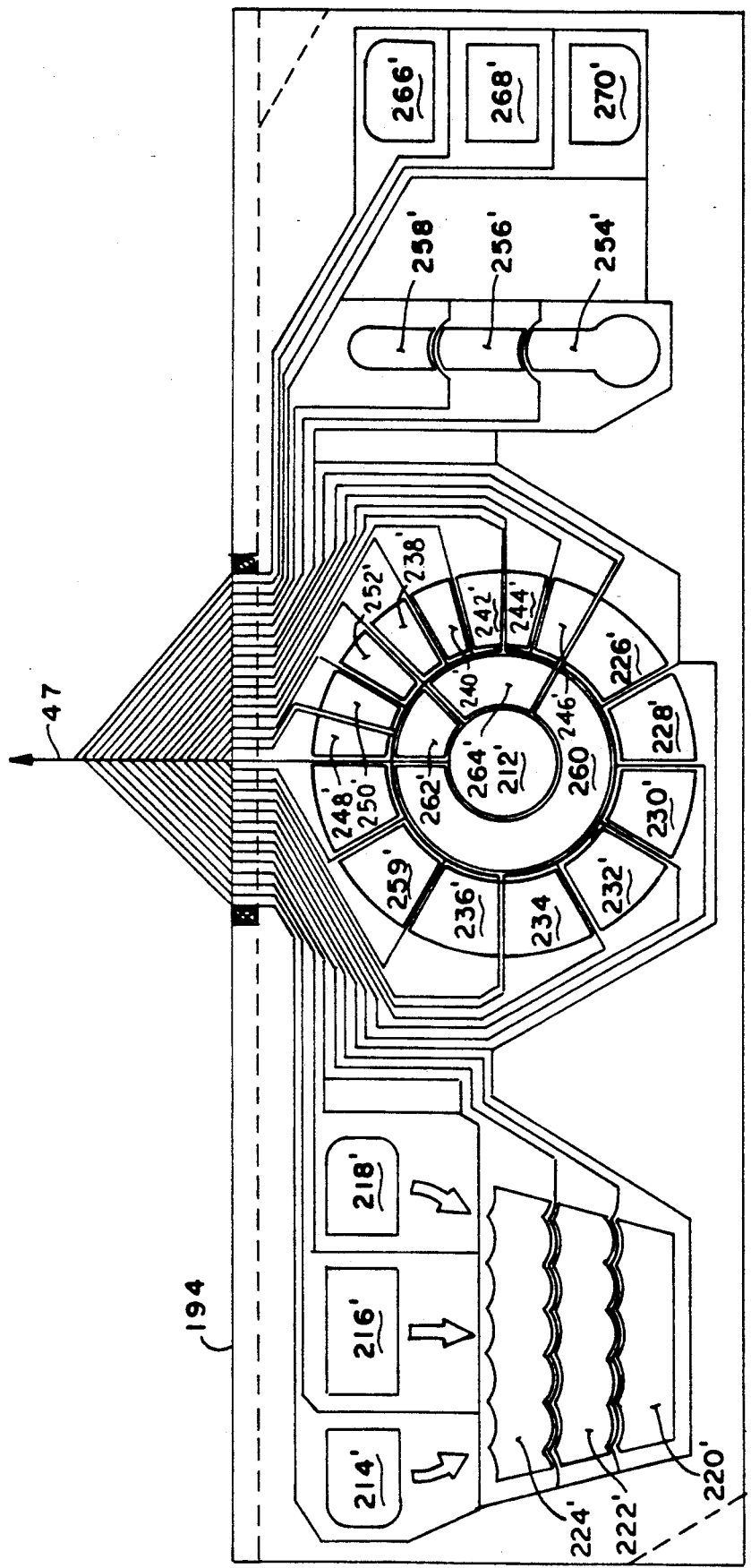
FIG. 17 is a detail of the liquid crystal film display cell layer of the panel of FIG. 15.

Referring to FIG. 17, the individual pixels are shown on the liquid crystal film layer 194 corresponding with the touch of the overlay of FIG. 16 and correspondingly numbered with a prime designation added. Each of the pixels in FIG. 17 turns clear or transparent upon the user touching the correspondingly numbered area on the graphic overlay. This is the result of the user touch being transferred through the Color Reflector layer 196 to the Switch Contactor layer 198.

Figure 18:
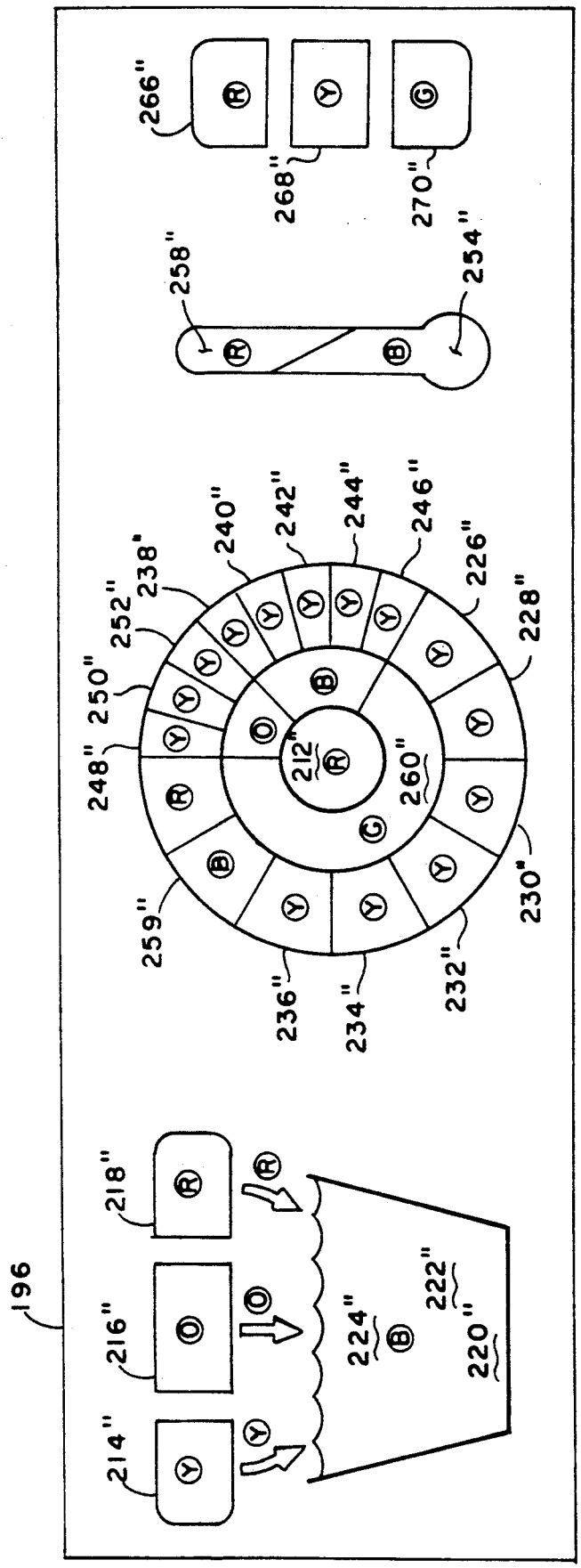
FIG. 18 is a detail of the color reflector layer of the panel of FIG. 15.

Referring to FIG. 18, the color reflector layer 196 has the areas thereof corresponding to the touch areas of FIG. 16 correspondingly numbered with a double prime added. The numbered areas of FIG. 18 may be any desired color combination such as red, orange, yellow, green and blue as indicated by letters R, O, Y, G. and G in FIG. 18, e.g. blue for cold and red for hot.

The user input touch areas for the selection for the washing, rinsing and spin functions and the desired time intervals therefore are arranged in concentric rings with the function touch areas 262, 264 and 260 disposed centrally within an outer annular array of the time selection touch areas.

Figure 19:
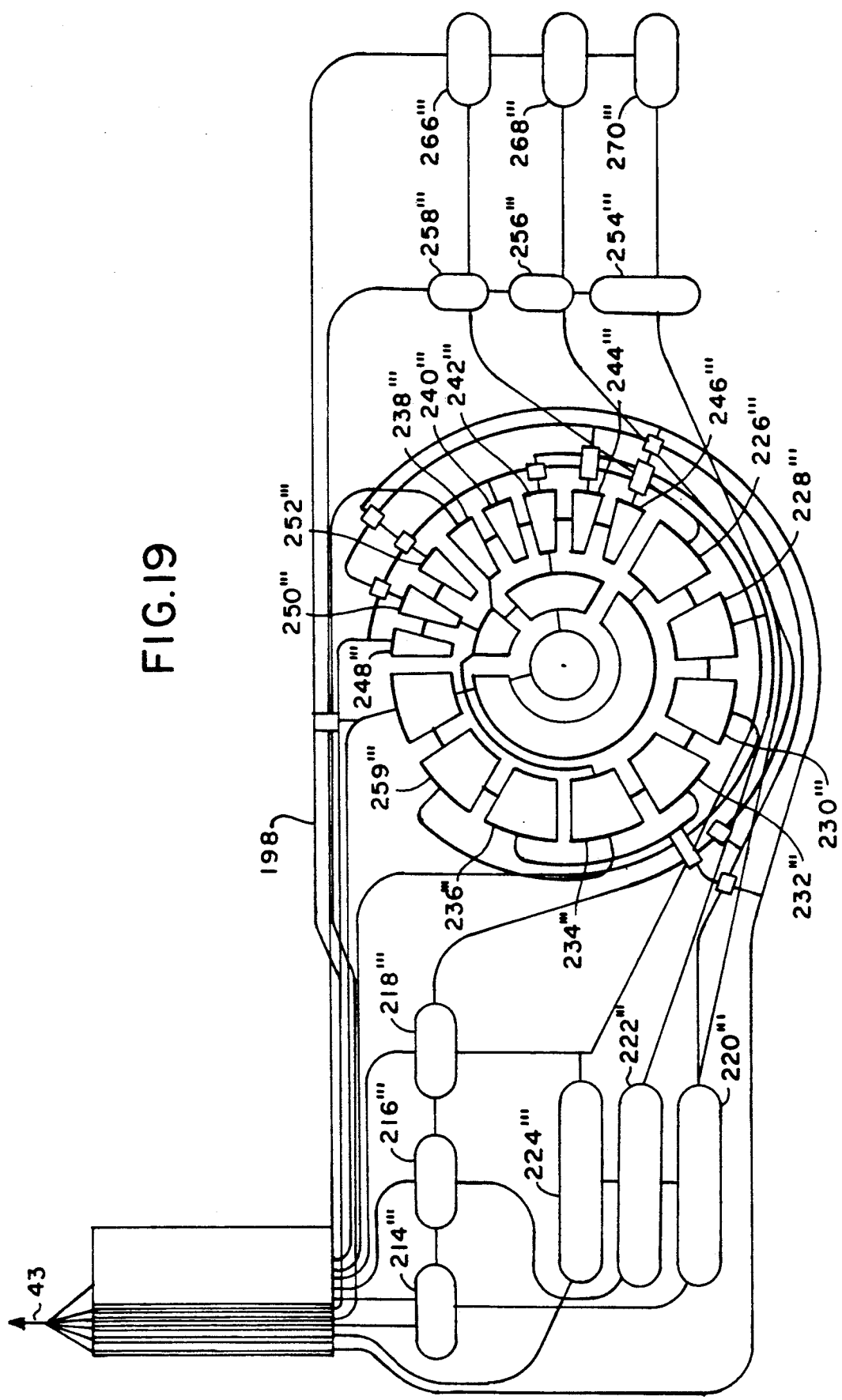
FIG. 19 is a detail of the switch control layer of the panel of FIG. 15.

Referring to FIG. 19, the discrete switch contact areas on switch layer 198 each comprise 2 spaced conductive layers numbered correspondingly to those of FIG. 16 with triple primes added. The panel 40, with layers 192, 194, 196 and 198 is available from Taliq, Inc. 1277 Reamwood Avenue, Sunnyvale, Calif. 94089-2234 with the purchasers specifying graphic arrangement of the switches and touch areas.

If the user touches one of the wash time areas 226-236, or one of the "RINSE" or "SPIN" areas greater than the value being displayed, the intermediate areas become sequentially eliminated in a clockwise direction; and, upon machine "START" the eliminated areas time down sequentially to dark in an anti-clockwise fashion.

If the selected value is less than the displayed value, the eliminated area representing a greater time sequentially goes dark in an anti-clockwise manner to correlate with the selected value.

It the user wishes to select only certain functions, this is permissible, i.e. "RINSE" may be selected without the need to select a wash or spin cycle.

The display panel 40 thus provides a unique arrangement whereby the time interval for the particular selected machine function or functions associated with a particular mode of operation are displayed concentrically about the selected function and are illuminated during the program and go dark sequentially in an anticlockwise manner as the program times down.

Figure 26:
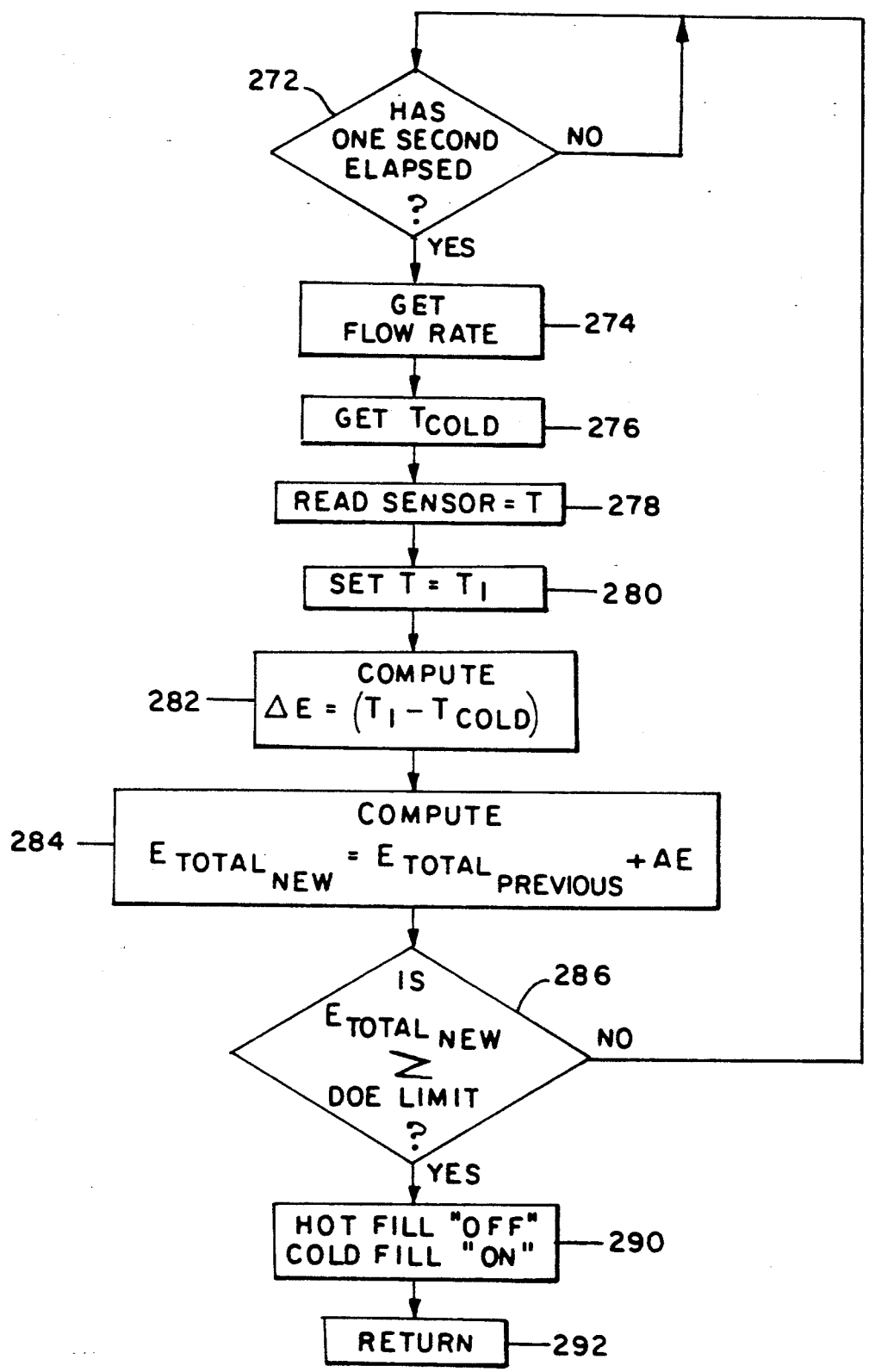

Referring to FIG. 26, the procedure for determining the thermal energy limit cutoff for heated wash fluid fill is shown in block diagram form for the thermal energy limiting fill control or DOE mode of operation.

A one second time delay is imposed at step 272 for controlling the sampling rate and the flow rate is then obtained at step 274 and the sensor 49 is read at step 276 and the value is stored as T1 at step 278. At step 280 the value of change in energy $\Delta E$ is computed from the value of T1 at step 278 and the stored value of Tcold.

The value of the total energy is then computed at step 282 and is compared with the DOE limit at step 284. If the total energy computed in step 282 is equal to or greater than the DOE limit, then the system proceeds to step 286 and turns off the hot water fill and turns the cold fill on. The system then returns to its position in the operation at step 288.

Figure 14:
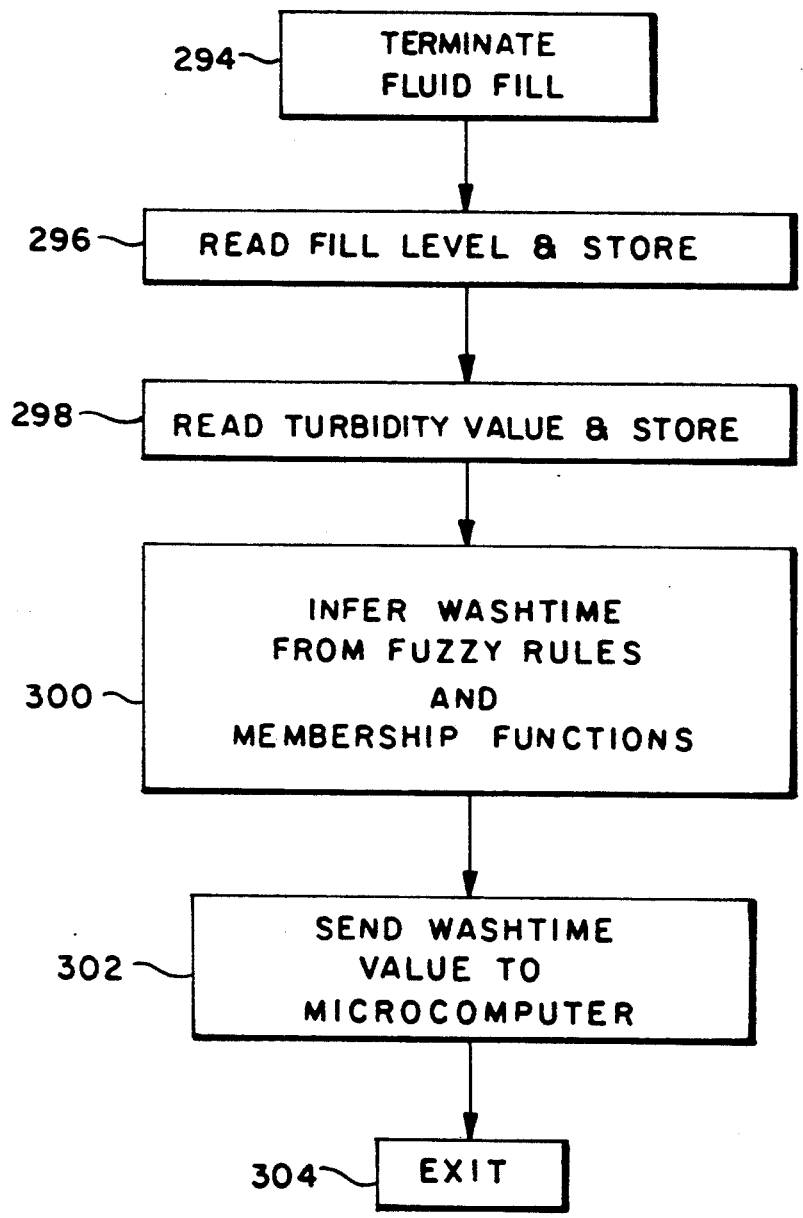
FIG. 14 is a block flow diagram of the automatic washtime computation for Option 3 mode of machine operation.

Referring to FIG. 14 a block diagram for the microcomputer operation out of the Option 3 mode of machine operation implying fuzzy logic is shown wherein at step 294 the mode fill is terminated and the fill level value is read and stored at step 296. The system goes on to read the value of the turbidity sensor and store the value at step 298. At step 300 the wash time is inferred from the fuzzy rules and membership functions as set forth herein above with respect the description relating to FIGS. 7-10. At step 302 the system sends the wash time value computer 72 and exits at step 304.

The present invention thus provides for determining automatically the wash time using fuzzy inference and a set of rules based on inputs from a turbidity sensor and a water fill sensor. The machine control system also has the capability to provide an energy limiting water fill to control the thermal energy entering the machine in the heated washing fluid. The control system of the present invention also provides the capability in the Autofill Mode to determine the minimum of water fill required to wash a given load of clothes.

The machine utilizes novel fill level sensing techniques by sensing the reflection of either an ultrasonic or audible acoustic signal reflected from the clothes as the tub is filled. The point at which the clothes are totally immersed in the fluid fill is ascertainable from dramatic changes in the reflected acoustic signal which enables the water fill to be terminated at the point where the clothes are totally immersed.

The control system of the present invention employs a unique novel flat panel touch pad for user input of machine function selections with the selected times disposed in an annular array about the selected functions. Selection of a particular function illuminates the time array in a sequential clockwise manner to the appropriate fraction of the total program interval for that function. The user may select any function and a desired time therfore; and, when the selected time is less than the displayed time the time array sequentially darkens in an anti-clockwise manner to the selected value. If the selected time is greater than the displayed time, the annular time array sequentially increments in a clockwise manner to the selected value. As the program continues the time array sequentially darkens or decreases in an anti-clockwise manner to indicate the remaining portion of the program interval as a fraction of the total amount of the annular array illuminated.

Although the invention has herein above been described with respect to the illustrated embodiments, it will be understood to those having ordinary skill in the art that the invention is capable of modification and variation and is limited only by the following claims.

We claim:

1. A control system for an appliance of the type automatically cleansing articles of apparel with heated and/or unheated fluid in a walled receptacle comprising:
   (a) fill valve means operable upon connection to a source of cleansing fluid and upon energization and de-energization to control flow of said fluid to said receptacle;
   (b) transducer means disposed exteriorly of said receptacle operable to generate acoustic vibrations in the wall of said receptacle during said fluid flow;
   (c) receiver means operable to detect sound waves within said receptacle generated by said wall vibrations and to provide a fill signal indicative of said sound wave;
   (d) circuit means operable to analyze said fill signal and to determine from the acoustic signature thereof the occurrence of total immersion of said articles in the fluid and thereupon to generate a fill-stop signal; and,
   (e) means operable in response to said fill-stop signal to de-energize said fill valve means.

2. The system defined in claim 1, wherein said circuit means includes an electret or microphone and compares the energy of the output thereof for a selected time interval with a reference energy level to generate said fill stop signal.

3. The system defined in claim 1, wherein said transducer means generates said vibrations in the frequency range 2–4 KiloHertz (2000–4000 Hz).

4. The system defined in claim 1, wherein said transducer comprises a solenoid impacting a stop to provide a ringing on said receptacle.

5. The control system defined in claim 1, further comprising temperature transducer means operable to sense the temperature of said fluid flowing into said receptacle and to provide an electrical temperature signal indicative of the sensed temperature; and, means operable in response to said temperature signal to stop fill of heated fluid.

* * * * *